United States Patent [19]
Yoshinaga et al.

[11] Patent Number: 5,475,515
[45] Date of Patent: Dec. 12, 1995

[54] LIQUID CRYSTAL DEVICE HAVING A STRETCHED POROUS POLYMER FILM IMPREGNATED WITH A LOW MOLECULAR WEIGHT MESOMORPHIC COMPOUND

[75] Inventors: Kazuo Yoshinaga, Machida; Ryoji Fujiwara, Chigasaki; Yomishi Toshida, Yokohama; Toshikazu Ohnishi, Machida; Koichi Sato, Yamato; Takeo Eguchi, Atsugi; Tsuyoshi Shibata, Yokohama, all of Japan

[73] Assignee: Canon Kabushiki Kaisha, Tokyo, Japan

[21] Appl. No.: 232,411

[22] Filed: Apr. 25, 1994

Related U.S. Application Data

[63] Continuation of Ser. No. 874,832, Apr. 28, 1992, abandoned.

[30] Foreign Application Priority Data

| May 1, 1991 | [JP] | Japan | 3-126528 |
| Aug. 2, 1991 | [JP] | Japan | 3-216578 |
| Apr. 23, 1992 | [JP] | Japan | 4-129382 |

[51] Int. Cl.⁶ ............................ G02F 1/13; G02F 1/133
[52] U.S. Cl. .................... 359/52; 359/51; 359/53
[58] Field of Search .................. 359/51, 52, 103, 359/53

[56] References Cited

U.S. PATENT DOCUMENTS

| 4,048,358 | 9/1977 | Shanks | 428/1 |
| 4,411,495 | 10/1983 | Beni et al. | 350/347 V |
| 4,435,047 | 3/1984 | Fergason | 350/344 |
| 4,688,900 | 8/1987 | Doane et al. | 359/103 |
| 4,707,080 | 11/1987 | Fergason | 350/344 |
| 4,714,323 | 12/1987 | Katagiri et al. | 350/350 S |
| 4,820,026 | 4/1989 | Okada et al. | 350/341 |
| 4,844,597 | 7/1989 | Katagiri et al. | 350/350 S |

(List continued on next page.)

FOREIGN PATENT DOCUMENTS

| 0313053 | 4/1989 | European Pat. Off. | 359/51 |
| 0343903 | 11/1989 | European Pat. Off. | |
| 63-271233 | 11/1988 | Japan . | |
| 1-198725 | 8/1989 | Japan . | |
| 2-264215 | 10/1990 | Japan | 359/103 |
| 2-264216 | 10/1990 | Japan | 359/103 |
| 2-271318 | 11/1990 | Japan | 359/103 |
| 2-271319 | 11/1990 | Japan | 359/103 |
| 2-310520 | 12/1990 | Japan | 359/103 |
| 3-282426 | 12/1991 | Japan | 359/103 |
| 4-14015 | 1/1992 | Japan | 359/103 |
| WO90/04805 | 5/1990 | WIPO . | |

OTHER PUBLICATIONS

Doane et al, "Wide-angle-view PDLC displays", SID Digest, vol. XXI (May 1990), pp. 224–226.

Fox et al, "The spreading of liquids on low energy surfaces. I. Polytetrafluoroethylene", J. Coll. Sci., vol. 5, No. 6 (Dec. 1950) pp. 514–531.

Shibaev et al., "Thermotropic liquid-crystalline polymers: 14. Thermo-recording on liquid crystalline polymers with the aid of a laser beam", Polymer Communications, vol. 24, No. 12 (Dec. 1983), pp. 364–365.

*Primary Examiner*—Anita Pellman Gross
*Attorney, Agent, or Firm*—Fitzpatrick, Cella, Harper & Scinto

[57] ABSTRACT

The liquid crystal device is constituted by disposing a display layer between a pair of electrode plates. The display layer comprises a stretched porous polymer film having open pores and a low-molecular weight mesomorphic compound impregnating the polymer film. The display layer further comprises a porous polymer film having a three dimensional network structure characterized by a fibril diameter of at most 0.3 micron, and a low-molecular weight mesomorphic compound impregnating the polymer film. The display layer still further comprises a first display layer comprising a porous film and a low-molecular weight mesomorphic compound impregnating the porous film, and a second display layer comprising the low-molecular weight mesomorphic compound.

30 Claims, 8 Drawing Sheets

U.S. PATENT DOCUMENTS

| | | | |
|---|---|---|---|
| 4,878,741 | 11/1989 | Fergason | 359/51 |
| 4,883,344 | 11/1989 | Okada et al. | 350/339 R |
| 4,952,033 | 8/1990 | Davis | 350/351 |
| 5,039,208 | 8/1991 | Ohnishi et al. | 359/100 |
| 5,088,807 | 2/1992 | Waters et al. | 359/51 |
| 5,093,735 | 3/1992 | Doane et al. | 359/52 |
| 5,120,466 | 6/1992 | Katagiri et al. | 252/299.01 |
| 5,268,783 | 12/1993 | Yoshinaga et al. | 359/51 |
| 5,296,952 | 3/1994 | Takatsu et al. | 359/53 |
| 5,301,046 | 4/1994 | Konuma et al. | 359/52 |
| 5,327,271 | 7/1994 | Takeuchi et al. | 359/51 |

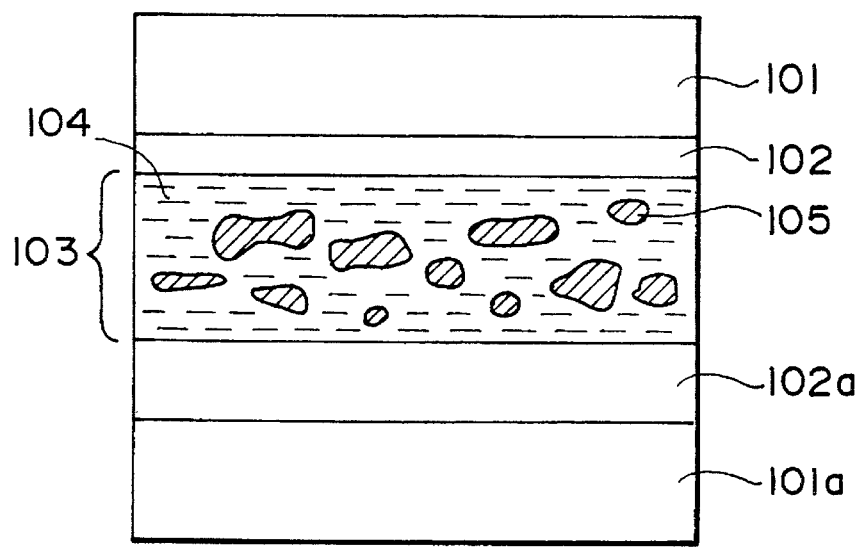
F I G. 1A
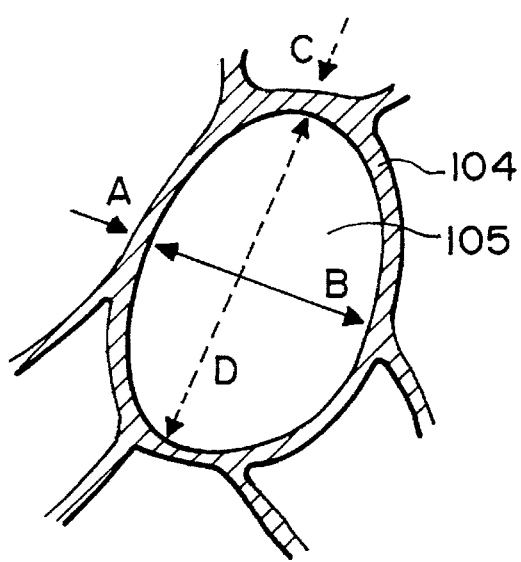
F I G. 1B

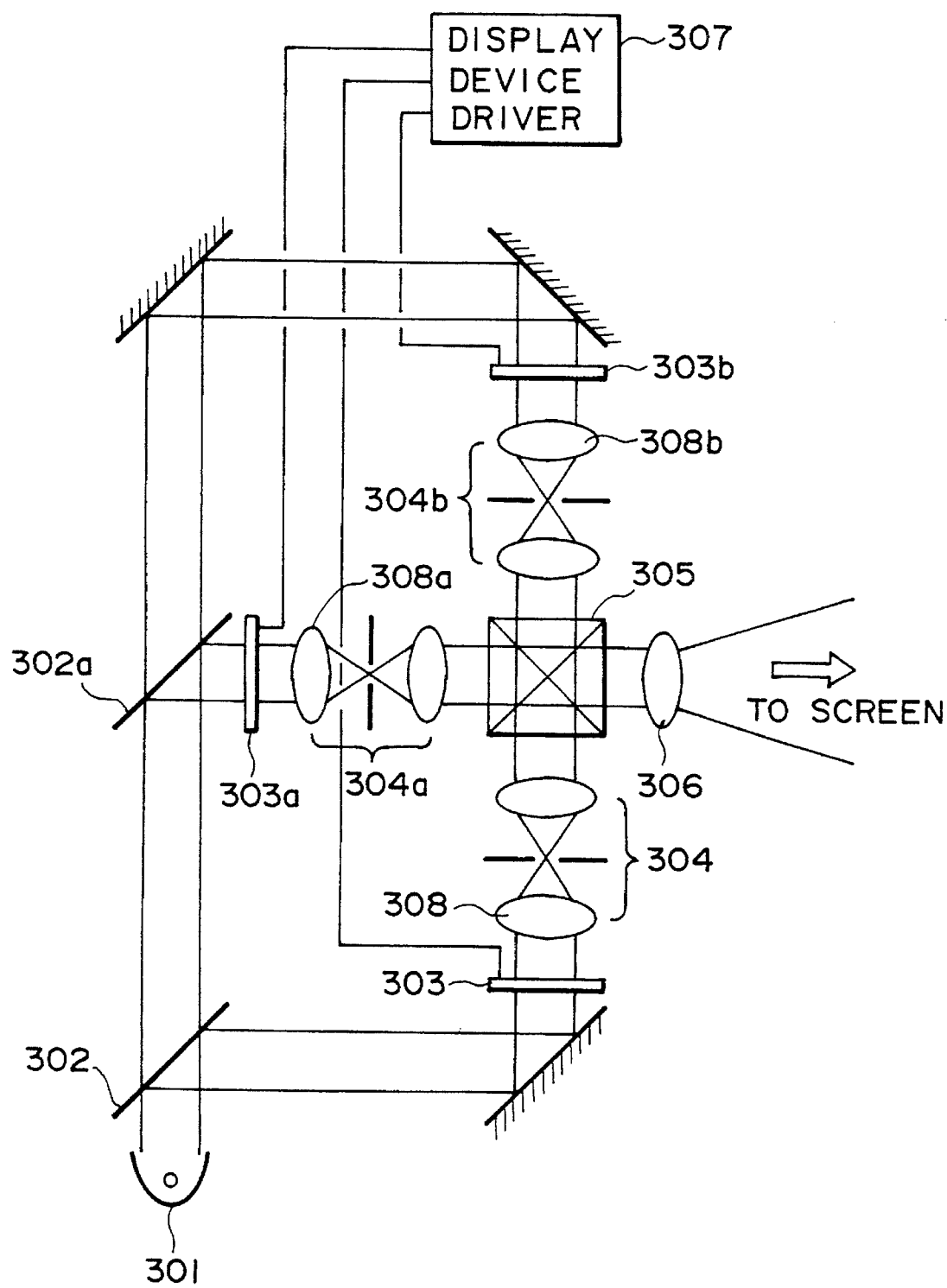
F I G. 3

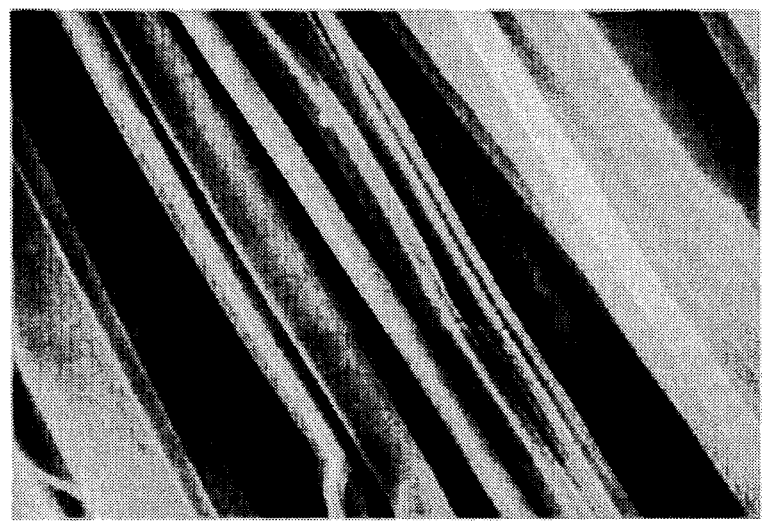
(×10,000)  1μm
F I G. 5 A
(×10,000)  1μm
F I G. 5 B

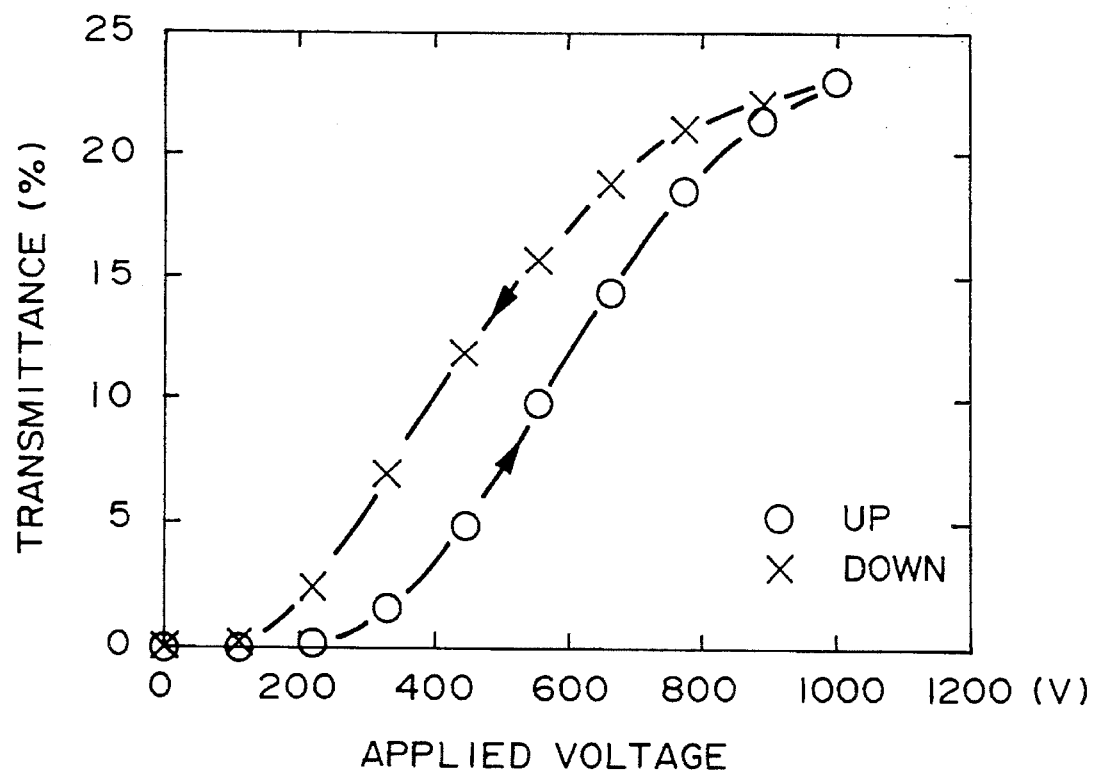
F I G. 9

LIQUID CRYSTAL DEVICE HAVING A STRETCHED POROUS POLYMER FILM IMPREGNATED WITH A LOW MOLECULAR WEIGHT MESOMORPHIC COMPOUND

This application is a continuation of application Ser. No. 07/874,832, filed Apr. 28, 1992, now abandoned.

FIELD OF THE INVENTION AND RELATED ART

The present invention relates to a thermo-optical and electro-optical display device utilizing transmitted light and scattered light, particularly to a liquid crystal device containing a display layer comprising a specific porous film material having open pores and a low-molecular weight mesomorphic compound, a display apparatus using the device and a display method using the device.

Liquid crystal materials have been used for various thermo-optical and electro-optical display devices. These display devices have now been actively developed because of a low driving voltage and low energy consumption. One technical problem of these devices is to provide a display device of a large area.

In order to produce a display device of a large area easily, there have been suitably used polymeric or polymer liquid crystals. As an example of a liquid crystal display system using a polymeric liquid crystal, it is possible to raise a polymeric liquid crystal display device of a thermal writing-type as disclosed in Polymer Communications, Vol. 24, p.p. 364–365, "Thermotropic Liquid Crystalline Polymers 14" by V. Shibaev, S. Kostromin, N. Plate, S. Ivanov, V. Vestroy and I. Yakovlev.

The above-described system, however, involves several problems such as high energy consumption and a delay in response accompanying the use of a polymeric liquid crystal when an electric field is applied, so that it has not been put to practical use.

There has been proposed a liquid crystal device containing a porous cellulose-type polymer matrix comprising, and a liquid crystal impregnating the porous polymer matrix (U.S. Pat. No. 4,411,495). The liquid crystal device controls transparent and scattering states by utilizing a difference in a refractive index between the porous polymer matrix and the liquid crystal. However, the liquid crystal device failed to provide a sufficient contrast and also provided an undesirably high threshold voltage.

A porous film generally has a property of orienting liquid crystal molecules in a random state to scatter the incident light. In order to control such a property (e.g., aligning-controlling force), the porous film is required to have a large pore size and increase a volume fraction (or a content) of the liquid crystal in view of improvements in light transmittance and contrast and a decrease in a threshold voltage.

However, the porous film having a large pore size and high liquid crystal content fails to provide a high strength and stable properties and causes hysteresis on the light transmittance.

For example, U.S. Pat. No. 4,435,047 to Manchester R & D Partnership discloses a liquid crystal device containing an encapsulated low-molecular weight mesomorphic compound (or liquid crystal) dispersed in polyvinyl alcohol as a polymer matrix. Further, U.S. Pat. No. 4,707,080 discloses a liquid crystal device containing a low-molecular weight mesomorphic compound in a connected tubular form dispersed in a polymer matrix. There has also been reported a liquid crystal device containing a low-molecular weight mesomorphic compound dispersed in a polymer liquid crystal used as a polymer matrix (J. W. Doane, J. L. West, J. B. Whitehead, Jr., D. S. Fredley, "Wide-Angle-View PDLC Displays", 1990 Society for Information Display International Symposium Digest of Technical Papers, Lecture No. 12, 5, p.p. 224–226, May (1990)). The above device brought about improvements in viewing angle and scattering degree.

The above-mentioned devices suitable for easily providing liquid crystal devices of a large area have faster response speeds than those of the conventional devices containing a nematic or cholesteric polymer liquid crystal. The devices also have good light transmittance and are not required to use a polarizer.

However, the above-mentioned devices cannot have an increased content of the low-molecular weight mesomorphic compound because of restriction on the polymer matrix, whereby light transmittance of the display layer is undesirably decreased unless refractive indices $n_e$ (extraordinary index) and $n_o$ (ordinary index) of the low-molecular weight mesomorphic compound are equal (or approximately equal) to those of the polymer matrix. The above-mentioned U.S. Pat. No. 4,435,047 has disclosed that the difference in refractive indices therebetween may preferably be at most 0.01, more preferably at most 0.001. Such decreased difference in the refractive indices can be provided by appropriately selecting materials constituting a low-molecular weight mesomorphic compound and a polymer matrix. However, latitude in choice of the materials suitable for providing the decreased difference in the refractive indices have considerably been restricted since it is difficult to match the refractive indices of a material for the low-molecular weight mesomorphic compound with those of a material for the polymer matrix in some cases.

Further, the above-mentioned devices containing the low-molecular weight liquid crystal dispersed and held in the polymer matrix had an insufficient interfacial alignment-controlling force, so that it was difficult to obtain a desirable threshold voltage for matrix driving. As a result, the devices have a drawback in providing a high resolution system although it could provide a large area. Further, as an optical modulation principle, the devices utilizes scattering due to a difference in refractive index between the low-molecular weight liquid crystal and the polymer matrix, but it has been difficult to obtain a sufficient refractive index difference. As a result, the devices require considerably thick display layers for effecting sufficient cut-off of light and for providing high contrast.

The above-mentioned devices are liable to provide an unstable interfacial state because an interface between the polymer matrix and low-molecular weight mesomorphic compound is formed at preparation of a display device, and the polymer matrix fails to provide a clear interfacial alignment-controlling force compared with a polyimide alignment film having been subjected to rubbing. As a result, hysteresis with respect to light transmittance is observed when an applied driving voltage is charged upward and downward, thus resulting in deterioration in an image quality, contrast, etc. when it is required to provide a gradation display for, e.g., TV. Moreover, the devices have further defects including: poor drive characteristics due to unstable interface changed by ambient temperature; deterioration in device characteristics in a panel preparation step due to insufficient heat resistance of the polymer matrix; and difficulty in providing a display device employing a thin film transistor (TFT) due to a high driving voltage.

In order to reduce the driving voltage, some liquid crystal devices wherein a content of a liquid crystal component is increased or a diameter of droplets of a low-molecular weight mesomorphic compound is controlled by polymerizing a mixture of the low-molecular weight mesomorphic compound and a polymerizable monomer resulting in a polymer matrix have been proposed (e.g., Japanese Laid-Open Patent Application (JP-A) Nos. 502128/1986, 271233/1988, and 198725/1989). The above devices, however, have been encountered problems such as difficulty in controlling physical properties including strength of a polymer matrix and decreased electrical resistance or deterioration in durability under the influence of inclusion of impurities in the monomer or a polymerizing catalyst with the low-molecular weight mesomorphic compound.

In order to solve the above problems, there have been proposed some liquid crystal devices employing a polymer matrix having a strong alignment-controlling force and high strength. Such a polymer matrix is constituted by a polymer material having a high polymerization degree, sufficiently crosslinked structure, or a high glass transition point. However, such a polymer matrix is liable to provide a high threshold voltage of the device and it is difficult to increase a content of a liquid crystal (or mesomorphic compound) since the polymer matrix has the above-mentioned strong alignment-controlling force, whereby light transmittance of a display layer of the device is decreased.

SUMMARY OF THE INVENTION

The present invention has been accomplished in order to remedy the above-mentioned drawbacks of the conventional liquid crystal devices.

An object of the present invention is to provide a liquid crystal display device containing a polymer matrix having sufficient strength and a good heat resistance even when the device contains a large amount of a low-molecular weight mesomorphic compound and also having good display and driving characteristics free of deterioration in durability due to impurities.

Another object of the present invention is to provide a liquid crystal device having good light transmittance to effect a good display even when a refractive index of a low-molecular weight mesomorphic compound is not sufficiently matched with that of a polymer matrix.

A further object of the present invention is to provide a large-area liquid crystal device capable of effecting display with a high contrast, a good gradation, a good threshold characteristic and no hysteresis.

Still further object of the present invention is to provide a display apparatus and a display method employing the liquid crystal devices described above.

According to a first aspect of the present invention, there is provided a liquid crystal device, comprising: a pair of electrode plates, and a display layer disposed between the electrode plates; the display layer comprising a stretched porous polymer film having open pores, and a low-molecular weight mesomorphic compound impregnating the porous polymer film.

According to a second aspect of the present invention, there is provided a liquid crystal device, comprising: a pair of electrode plates, and a display layer disposed between the electrode plates; the display layer comprising a porous polymer film having a three-dimensional network structure characterized by a fibril having a diameter of at most 0.3 micron, and a low-molecular weight mesomorphic compound impregnating the porous polymer film.

According to a third aspect of the present invention, there is provided a liquid crystal device, comprising: a pair of electrode plates, and a first display layer and a second display layer disposed between the electrode plates; wherein the first display layer comprises a porous film and a low-molecular weight mesomorphic compound impregnating the porous film, and the second display layer comprises the low-molecular weight mesomorphic compound.

The present invention provides a display apparatus, including: any one of the above liquid crystal devices described above, means for emitting light, means for applying voltage to the device, and means for separating the light into transmitted light and scattered light.

The present invention also provides a display method, comprising: illuminating any one of the above liquid crystal devices described above with light and effecting display by separating the light into transmitted light and scattered light.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1A is a schematic sectional view showing an embodiment of the liquid crystal device according to the present invention and FIG. 1B is a partly enlarged view thereof.

FIG. 3 is an explanatory view of a display apparatus employing the liquid crystal device according to the present invention.

FIG. 5A is a photograph of a porous polymer film material before hydrogen plasma treatment used in Example 3 by means of a scanning electron microscope (SEM: magnification of 10,000) and FIG. 5B is a photograph of a porous polymer film having been subjected to hydrogen plasma treatment used in Example 3 by means of the SEM (magnification of 10,000).

FIG. 9 is a graph of light transmittance versus applied voltage in Comparative Example 4.

DETAILED DESCRIPTION OF THE INVENTION

Figure 2A:
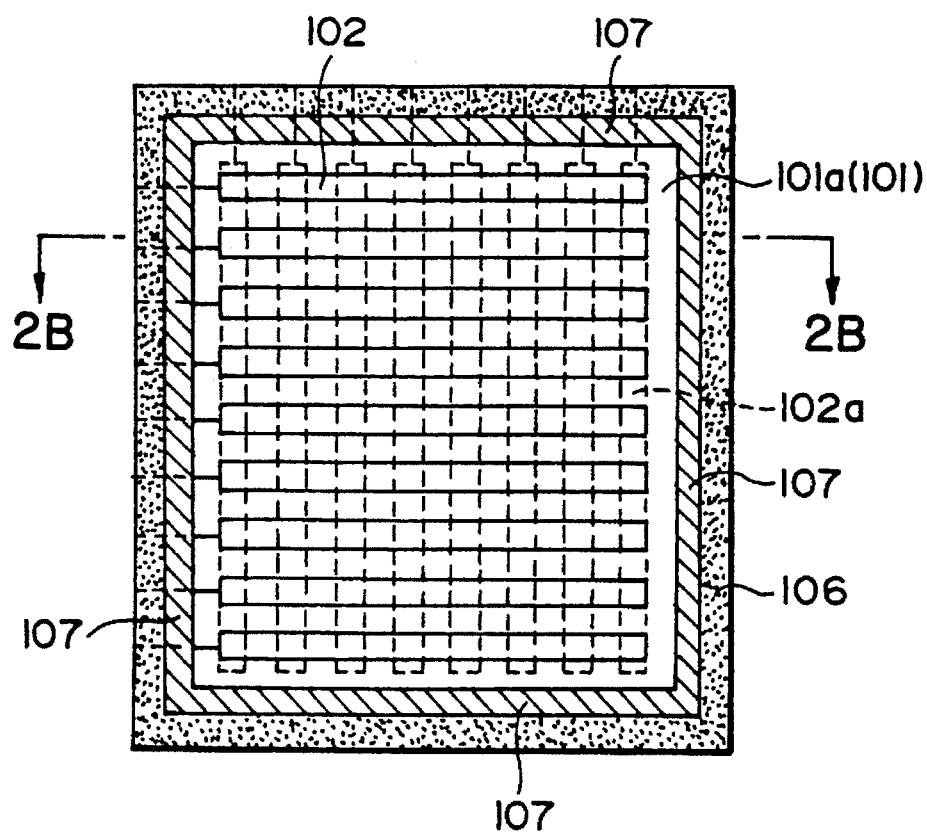
FIG. 2A is a schematic plan view of the liquid crystal device of the present invention.

Hereinbelow, the present invention will be explained in detail with reference to the drawings.

First, the liquid crystal device of the first aspect of the present invention will be explained.

FIG. 1A is a schematic sectional view of an embodiment of the liquid crystal device of the present invention for explanation of the structure thereof.

Referring to FIG. 1A, the liquid crystal device includes a display layer 103 comprising a low-molecular weight mesomorphic compound 105 and a porous polymer film 104 having open pores. The display layer 103 is disposed between a pair of substrates 101 and 101a each having thereon an electrode 102 or 102a.

Each of the substrates 101 and 101a may comprise glass or plastics, e.g., in the form of plate or film.

Examples of a polymer film used as the substrate may include: a low-density polyethylene film, a high-density polyethylene film (such as "Hibron", a product of Mitsui Toatsu Kagaku K.K.), a polyester film (such as "Torefan", a product of Toray K.K.), a polyester film.(such as "Myler", a product of Du Pont), a polyvinyl alcohol film (such as "Hicellon", a product Nihon Gosei Kako K.K.), a polyamide film (such as "Rayfan", product of Toyo Gosei Film K.K.), a polycarbonate film (such as "Teijin Panlight", a product of Teijin K.K.) a polyimide film (such as "KAPTON", a product of Du Pont), a polyvinyl chloride film (such as "Hishilex", a product of Mitsubishi Jushi K.K.), a polytetrafluoroethylene film (such as "Teflon", a product of Mitsui Fluorochemical K.K.), a polyacrylate film (such as "Sumilate", a product of Sumitomo Bakelite K.K.), a polystyrene film (such as "Styrosheet", a product of Asahi Dow K.K.), a polyvinylidene chloride film (such as "Saran Film", a product of Asahi Dow K.K.), a cellulose film, a polyvinylidene fluoride film (such as "Tedler", a product of Du Pont) and a polyethersulfone film (such as "Sumilite" a product of Sumitomo Bakelite K.K.).

The electrodes 102 and 102a formed on the substrates may include a transparent electrode comprising ITO (indium-tin-oxide) or $SnO_2$, and a metal film comprising Al, Au, Ag, Cu or Cr. It is possible to use the electrodes as an electrode and a reflective layer in a reflection-type display device. The thus prepared substrates with the electrodes may be inclusively referred to herein as "electrode plates".

In the embodiment, the display layer 103 disposed between the electrode plates comprises a stretched porous polymer film 104 and a low-molecular weight mesomorphic compound 105 impregnating the polymer film 104. The display layer 103 may be prepared in the following manner. A polymer film is stretched to form a porous polymer film and then is disposed between the electrode plates. Then, the porous polymer film is impregnated with a low-molecular weight mesomorphic compound. The thickness of the display layer 103 may generally be 0.5–100 microns, preferably 1–50 microns. Below 0.5 micron, it is difficult to obtain sufficient contrast. On the other hand, above 100 microns, it is difficult to drive the liquid crystal device at high speed as a large driving voltage is required.

In the display layer 103, the polymer film material 104 constitutes a continuous matrix and the low-molecular weight mesomorphic compound 105 is dispersed therein in any shapes including spheres or spheroids or further irregularly elongated shapes like bars, inclusive of those attached to a substrate at one end thereof- A diameter of the dispersed low-molecular weight mesomorphic compound may preferably be 0.1–10 microns, more preferably 0.3–5 microns. Outside the range of 0.1–10 microns, it is difficult to obtain sufficient scattering, thus failing to provide a good contrast. Herein, for the shapes other than the sphere, the above diameter means a diameter of a shorter axis of the dispersed low-molecular weight mesomorphic compound when approximated to a spheroid or a cylindrical bar.

Examples of the porous polymer film 104 used in the display layer 103 may include: a polyethylene film, a polypropylene film, a polycarbonate film, a polyvinyl chloride film, a polytetrafluoroethylene film, and a polyvinylidene fluoride film. The porous polymer film material 104 has open pores which can communicate matter such as a solid, liquid or gas. In order to obtain sufficient open pores (or a porosity), the porous polymer film may preferably have a weight-average molecular weight (Mw) of at least 50,000. Below 50,000, the porous polymer film has an insufficient film strength when it has a high porosity, thus failing to provide stable properties such as heat resistance and durability.

A porosity of the porous polymer film is an important factor in view of an increase in a content (or a volume fraction) of the low-molecular weight mesomorphic compound. Herein, the porosity is obtained through the following equation of:

$$\text{Porosity (\%)}=[(X-Y)/(\text{volume of polymer film})\times(\text{specific gravity of liquid})]\times 100 \quad (1)$$

wherein X denotes a weight of a polymer film impregnated with a liquid having a known specific gravity and Y denotes a weight of the polymer film along.

In the present invention, the porous polymer film is used in combination with the low-molecular weight mesomorphic compound which is incompatible with the porous polymer film. The porosity of the porous polymer film may be 80–98%, preferably 85–95%. Below 80%, a driving voltage is liable to an increase. On the other hand, above 98%, it is difficult to prepare the liquid crystal device due to insufficient strength of the polymer film, thus resulting in a deterioration in durability, heat resistance, etc. The porosity (%) substantially corresponds to a volume fraction (or volume percentage) (%) of the lowmolecular weight mesomorphic compound in the display layer because the porous polymer film has open pores. Accordingly, the volume fraction of the low-molecular weight mesomorphic compound may be 80–98%, preferably 85–95%.

The porous polymer film having a high porosity of, e.g., 80–98% is prepared by stretching a porous or non-porous polymer film such as Hipore (manufactured by Asahi Kasei Kogyo K.K.) or Celpore (manufactured by Sekisui Kasei Kogyo K.K.).

When the porous polymer film is prepared by stretching the porous or non-porous polymer film, inclusion of impurities in the stretching process is advantageously suppressed compared with the conventional method wherein a mixture of a polymer and a liquid or solid is formed and then the liquid or solid is extracted or removed to prepare a porous structure. The porous polymer film prepared by stretching the porous or non-porous polymer film has a high porosity and is free from the impurities and a decrease in strength. Further, the porous polymer film does not deteriorate display characteristics when used in combination with the low-molecular weight mesomorphic compound, thus providing a liquid crystal device having a good durability and an improved temperature-dependence of response speed.

Example of methods of stretching may include uniaxial stretching (or orientation) and biaxial stretching (or orientation). The biaxial stretching may preferably be used in the present invention because it is possible to obtain a uniform porous polymer film having a high porosity.

A stretch ratio of the polymer film may preferably 1.5 to 50 with respect to the uniaxial stretching. When the biaxial stretching is conducted, the stretch ratio may preferably be 1.4 to 30, particularly 2 to 20, for each stretching direction. The stretch ratio in the present invention is obtained by calculating a ratio of a diameter of the low-molecular weight mesomorphic compound (B or D in FIG. 1B) to a diameter of the porous polymer film (A or C in FIG. 1B). More specifically, in FIG. 1B, the stretch ratio is obtained by the following equation of:

Stretch ratio=$B/A$ or $D/C$.

Each diameter of A, B, C and D is measured by using the SEM.

The porous polymer film used in the present invention may preferably include a polymer film of, e.g., polytetrafluoroethylene which has a low surface energy. The porous polymer film used in the present invention may preferably has a surface energy of 25 dyn/cm or below, particularly 20 dyn/cm or below, at the interface between the polymer and the low-molecular weight mesomorphic compound.

Herein, a surface energy of the porous polymer film is calculated in the following manner.

A polymer film having a smooth surface is provided by using a polymer material constituting a porous polymer film and then water is added dropwise thereto, whereby a droplet of water is formed on the surface of the polymer film. Then, a contact angle θ is measured by a contact angle meter (e.g., CA-S150, manufactured by Kyowa Kaimen Kagaku K.K.). A surface energy of the polymer is calculated from an equation:

$$\gamma_s = \gamma_i + \gamma_1 \cos \theta$$

wherein $\gamma_s$ is a surface energy of a polymer, $\gamma_1$ is a surface energy of a liquid, and $\gamma_i$ is an interface energy between the polymer and the liquid (Fox, H. W. and Zisman, W. A., "J. Colloid Sci.", 5, 514 (1950)). More specifically, it is possible to replace the interface energy $\gamma_i$ with 0, in general. Further, the above-measured value of the contact angle θ and the surface energy of water (72.8 dyn/cm at 20° C.) are substituted for θ and $\gamma_1$ in the above equation to obtain a surface energy of a polymer $\gamma_s$.

Preferred examples of the porous polymer film having a surface energy of 25 dyn/cm or below, particularly 20 dyn/cm or below may include a polytetrafluoroethylene film. When the polytetrafluoroethylene film having a surface energy of at most 25 dyn/cm is used in combination with the low-molecular weight mesomorphic compound for constituting the display layer, the low-molecular weight mesomorphic compound in a random orientation state shows a good perpendicular orientation characteristic (i.e., mesomorphic compound molecules are oriented perpendicularly to a spherical or tubular droplet wall) in the neighborhood of an interface clearly formed between the low-molecular weight mesomorphic compound and the polytetrafluoroethylene film, under no voltage application. As a result, the mesomorphic compound presumably assumes two orientation states of the perpendicular orientation and random orientation, whereby a good scattering state may be realized. When a voltage is applied, the low-molecular weight mesomorphic compound responds to the applied voltage to show a uniform orientation to a substrate, whereby a transparent state is obtained to provide a good contrast. Further, when the applied voltage is removed, the low-molecular weight mesomorphic compound quickly responds to the removal of the voltage application to show an original scattering state due to the good perpendicular orientation characteristic imparted by the polytetrafluoroethylene film. A liquid crystal device containing a display layer using the low-molecular weight mesomorphic compound and the polytetrafluoroethylene film shows a good threshold characteristic with no hysteresis because the perpendicular orientation characteristic of the low-molecular weight mesomorphic compound is very stable.

As described above, polytetrafluoroethylene is usable for constituting the stretched porous polymer film having open pores. Generally, polytetrafluoroethylene is a chemically and physically stable substance capable of using in a temperature range between −240° C. and 260° C. and excellent in resistance to acids, alkalis, climate and light. Further, high-purity polytetrafluoroethylene free of impurities is put into a practical use, so that it is possible to exclude an evil influence on the low-molecular weight mesomorphic compound. It is also possible to suppress electrolysis at the electrodes because of an extremely decreased moisture content. The polytetrafluoroethylene used for the porous polymer film may generally have a molecular weight (Mw) of at least 50,000 so as to provide a high porosity. Examples of such polytetrafluoroethylene may include: Goretex (manufactured by Japan Gorerex K.K.) and Fluoropore (manufactured by Sumitomo Denki Kogyo K.K.). However, the polytetrafluoroethylene used in the present invention is not restricted to the above examples.

In the first aspect of the present invention, the above-mentioned polytetrafluoroethylene which has been subjected to stretching so as to have a high porosity is used in combination with a low-molecular weight mesomorphic compound impregnating the polytetrafluoroethylene, and may be used in a volume fraction sufficient to form a continuous polymer matrix. The volume fraction of the polytetrafluoroethylene may preferably be 2–20%, particularly 5–20% in the display layer. Below 2%, it is difficult to align a low-molecular weight mesomorphic compound because an alignment-controlling effect of the polymer matrix is insufficient. Above 20wt. %, it becomes difficult to obtain a large change in refractive index based on orientation of the low-molecular weight mesomorphic compound under application of a driving voltage, whereby the liquid crystal device cannot provide a good contrast.

Then, specific examples of the low-molecular weight mesomorphic compound used in first to third aspect of the present invention may include those represented by the following structural formulas, which are shown below together with phase transition characteristics.

Herein, the respective symbols denote the following phases:

Cryst.: crystal,
SmC*: chiral smectic C phase,
SmA: smectic A phase,
SmB: smectic B phase,
SmC: smectic C phase,
SmE: smectic E phase,
SmF: smectic F phase,
SmG: smectic G phase,
Sm3: un-identified smectic phase,
Ch.: cholesteric phase,
N: nematic phase, and
Iso.: isotropic phase.

Chiral smectic mesomorphic compound

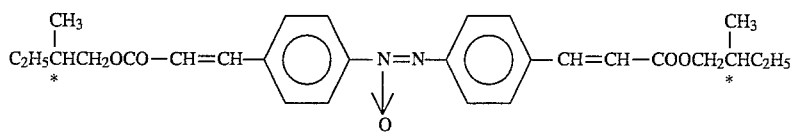
(I-1)

4,4-azoxycinnamic acid-bis(2-methylbutyl)ester

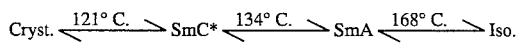

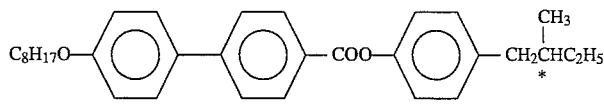
(I-2)

4-(2'-methylbutyl)phenyl-4'-octyloxybiphenyl-4-carboxylate

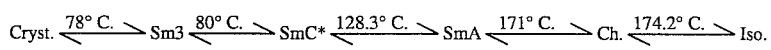

(I-3)

4-hexyloxyphenyl-4-(2''-methylbutyl)biphenyl-4'-carboxylate

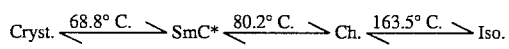

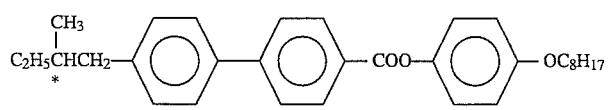
(I-4)

4-octyloxyphenyl-4-(2''-methylbutyl)biphenyl-4'-carboxylate

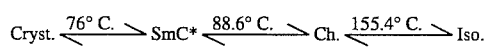

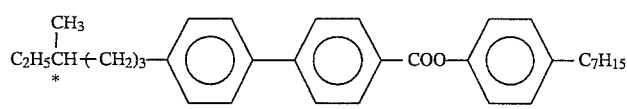
(I-5)

4-heptylphenyl-4-(4''-methylhexyl)biphenyl-4'-carboxylate

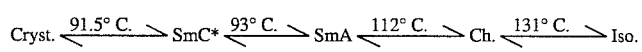

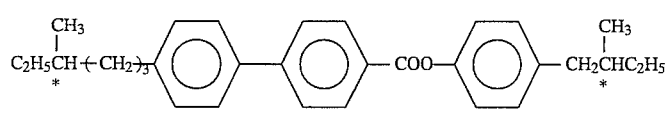
(I-6)

4-(2''-methylbutyl)phenyl-4-(4''-methylhexyl)-biphenyl-4'-carboxylate

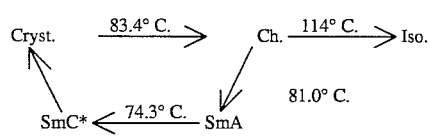

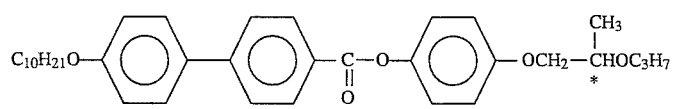
(I-7)

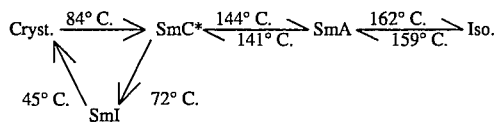
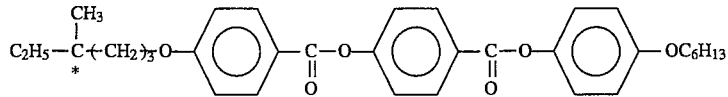 (I-8)
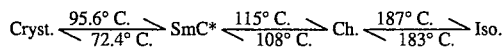
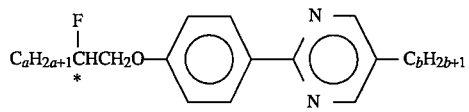 (I-9)
a = 4–12,  b = 8–16   (Case where a = 6, b = 12)
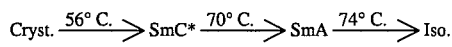
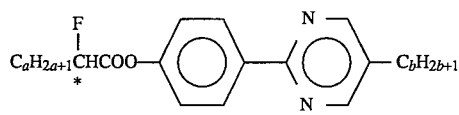 (I-10)
a = 4–12,  b = 8–16   (Case where a = 8, b = 10)
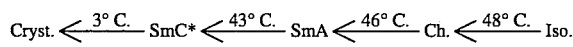
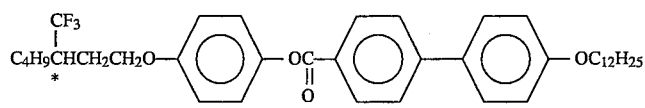 (I-11)
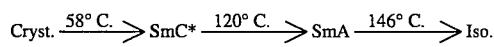
Non-chiral smectic mesomorphic compound
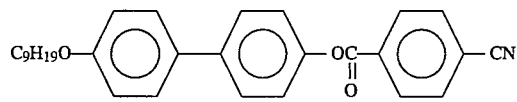 (I-12)
4'-n-nonyloxy-4-biphenyl-4-cyanobenzoate   Iso. ⟶ N. ⟶ SmC
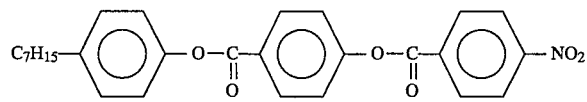 (I-13)
4-n-heptylphenyl-4-(4'-nitrobenzoyloxy)benzoate   Iso. ⟶ N. ⟶ SmA
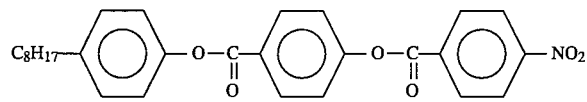 (I-14)
4-n-octylphenyl-4-(4'-nitrobenzoyloxy)benzoate   Iso. ⟶ N. ⟶ SmA ⟶ SmC
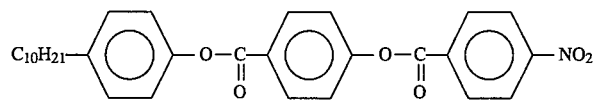 (I-15)
4-n-decylphenyl-4-(4'-nitrobenzoyloxy)benzoate   Iso. ⟶ N. ⟶ SmA ⟶ SmC -continued

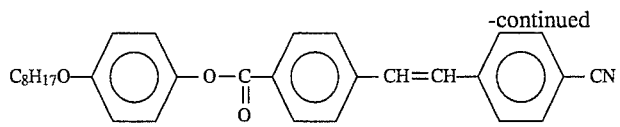 (I-16)

trans-4-(4"-octyloxybenzoyloxy)-4'-cyanostilbene  Iso. ⟶ SmA$_1$ ⟶ N. ⟶ SmA$_2$

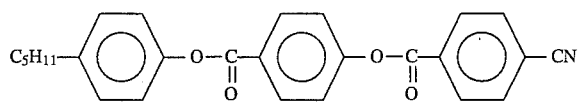 (I-17)

4-n-pentylphenyl-4-(4'-cyanobenzoyloxy)benzoate  Iso. ⟶ N. ⟶ SmA

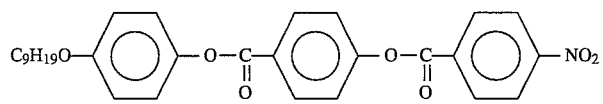 (I-18)

4-n-nonyloxyphenyl-4-(4'-nitrogenzoyloxy)benzoate  Iso. ⟶ N. ⟶ SmA ⟶ SmC

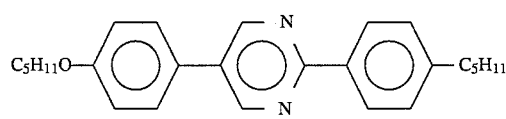 (I-19)

2-(4'-n-pentylphenyl)-5-(4"-n-pentyloxyphenyl)-pyrimidine  Iso. ⟶ SmA ⟶ SmC ⟶ SmF ⟶ SmG

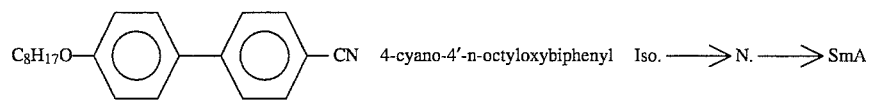 (I-20)

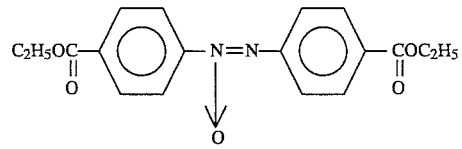 (I-21)

diethyl p,p'-azoxydibenzoate  Iso. ⟶ SmA

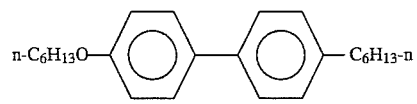 (I-22)

4-n-hexyl-4'-n-hexyloxybiphenyl  Iso. ⟶ SmB ⟶ SmE

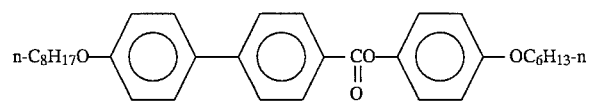 (I-23)

4-n-hexyloxyphenyl-4'-n-octyloxybiphenyl-4-carboxylate

Iso. ⟶ N. ⟶ SmA ⟶ SmC ⟶ SmB

 (I-24)

di-n-octyl-4,4"-terphenyl dicarboxylate  Iso. ⟶ SmA ⟶ SmC

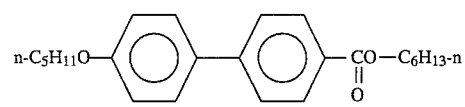 (I-25)

-continued n-hexyl-4'-n-pentyloxybiphenyl-4-carboxylate

Iso. ⟶ SmA ⟶ SmB ⟶ SmE

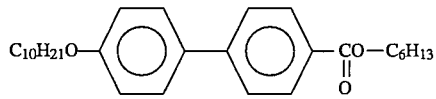
(I-26)

4-n-hexyl-4'-n-decyloxybiphenyl-4-carboxylate   Iso. ⟶ SmA ⟶ SmC

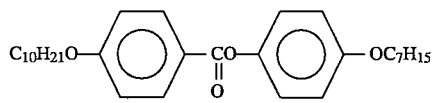
(I-27)

4-n-heptyloxyphenyl-4-n-decyloxybenzoate   Iso. ⟶ SmA ⟶ SmC

Nematic mesomorphic compound (or nematic liquid crystal)

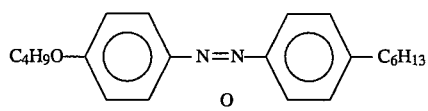
(I-28)

4-hexyl-4'-butyloxyazobenzene   Iso. $\xleftarrow{90°\ C.}$ N. $\xleftarrow{27°\ C.}$ Cryst.

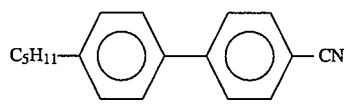
(I-29)

4-cyano-4'-pentylbiphenyl   Iso. $\xleftarrow{35°\ C.}$ N. $\xleftarrow{24°\ C.}$ Cryst.

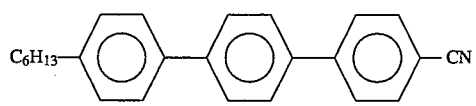
(I-30)

4-cyano-4'-hexylterphenyl   Iso. $\xleftarrow{228°\ C}$ N. $\xleftarrow{125°\ C.}$ Cryst.

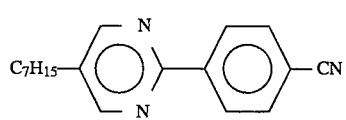
(I-31)

heptylcyanophenyl pyrimidine   Iso. $\xleftarrow{50°\ C.}$ N. $\xleftarrow{44°\ C.}$ Cryst.

Z-1625 (mfd. by Merck Co.) Nematic temperature range = −10 to 60° C. (I-32)
E-7 (mfd. by BDH Co.) Nematic temperature range = −10 to 60° C. (I-33)
R-200 (mfd. by Rosch Co.) Nematic temperature range = 0 to 65° C. (I-34)
D-X01A (mfd. by Dainippon Ink K.K.) Nematic temperature range = −26 to 68° C. (I-35)

ZLI-2008 (mfd. by Merck Co.) $T_{cl}$ (clearing point) = 64° C. Sm $\xrightarrow{<-20°\ C.}$ N (I-36)

ZLI-1840 (mfd. by Merck Co.) $T_{cl}$ = 90° C. Sm $\xrightarrow{<-20°\ C.}$ N (I-37)

TN403 (mfd. by Dainippon Ink K.K.) $T_{cl}$ = 82° C. Sm $\xrightarrow{<-20°\ C.}$ N (I-38)

E7 (mfd. by EM Chemicals Co.) (I-39)

In the present invention, a nematic mesomorphic compound (or liquid crystal) having a positive dielectric anisotropy may preferably be used as the low-molecular weight mesomorphic compound.

In the first to third aspect of the present invention, it is also possible to effect display by heating with a thermal head or laser light.

Examples of laser light may include: gas lasers such as He—Ne gas laser, $Ar^{2+}$ gas laser and $N_2$ gas laser; solid-state lasers such as ruby laser, glass laser and YAG laser; and semiconductor lasers. Among these lasers, a semiconductor laser having a wavelength of 600–1600 nm, particularly 600–900 nm may preferably be used. Further, it is possible to provide a lasers having a shorter wavelength by employing a second harmonic or third harmonic of these lasers.

When the laser light is used, the liquid crystal device further comprises a light absorption layer containing a laser light-absorbing substance or comprises a display layer dispersing or dissolving therein a laser light-absorbing substance. The laser light-absorbing substance may desirably show no absorption property in the region of visible light in view of a bad influence of the substance on a display surface.

Examples of such a laser light-absorbing substance may include: azo compounds, bisazo compounds, trisazo compounds, anthraquinone compounds, naphthoquinone compounds, phthalocyanine compounds, naphthalocyanine compounds, tetrabenzoporphyrin compounds, ammonium salt compounds, diimmonium salt compounds, and metal chelate compounds.

Among the laser light-absorbing substances, a substance for use in a semiconductor laser shows an absorption property in the region of near infrared ray and is usable for a stable light-absorbing dye. Such a substance also has a good compatibility with or dispersibility in the low-molecular weight mesomorphic compound. It is possible to obtain a thermally stable guest-host type memory or display medium by mixing a light-absorbing substance showing dichroism with the low-molecular weight mesomorphic compound.

The above-mentioned light-absorbing substances may be used singly or in combination of two or more species.

The substance may also be used in combination with another near infrared ray-absorbing dye or another dichroic dye.

Examples of such a near infrared ray-absorbing dye may include those such as cyanine, merocyanine, phthalocyanine, tetrahydrocholine, dioxazine, anthraquinone, triphenothiazine, xanthene, triphenylmethane, pyrilium, croconium, azulene and triphenylamine.

The above-mentioned light-absorbing substance is contained in the low-molecular weight mesomorphic compound in a proportion of 0.1–20%, preferably 0.5–10%.

Figure 2B:
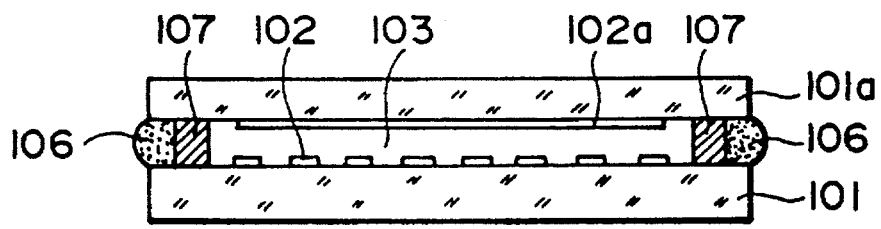
FIG. 2B is schematic view of the device shown in FIG. 2A taken along sectional 2B—2B.

FIGS. 2A and 2B show another structural embodiment of the liquid crystal device of the first aspect of the present invention, wherein FIG. 2A is a schematic plan view of the device and FIG. 2B is a schematic view of the device taken along sectional 2B—2B.

Referring to FIGS. 2A and 2B, the liquid crystal device of the present invention includes a pair of substrates 101 and 101a (at least one of which can have birefringence or be used in combination with a polarizer) comprising a glass plate or a plastic plate and held to have a prescribed (but arbitrary) gap with a spacer 107. The periphery of the substrates 101 and 101a is sealed up with an adhesive 106 such as an epoxy resin. On the substrate 101a, plural transparent electrodes 102a (e.g., electrodes for applying scanning voltage) with a prescribed pattern, e.g., in the form of stripes, are formed. On the other hand, plural transparent electrodes 102 (e.g., electrodes for applying signal voltage) with a reflection layer perpendicular to the electrodes 102a are formed on the substrate 101. It is possible to dispose a thin film transistor (TFT) on the substrate 101 or 101a.

Referring to FIG. 2B, a display layer 103 is disposed between the substrates 101 and 101a having the transparent electrodes 102 and 102a, respectively, thereon. In this embodiment, an alignment control layer may be formed on the transparent electrode.

The alignment control layer formed on the substrate 101a with the electrode 102a thereon may include: inorganic materials such as silicon monoxide, silicon dioxide, aluminum oxide, zirconia, magnesium fluoride, cerium oxide, cerium fluoride, silicon nitride, silicon carbide, and boron nitride; and organic materials such as polyvinyl alcohol, polyimide, polyamide-imide, polyester-imide, polyparaxylylene, polyester, polycarbonate, polyvinyl acetal, polyvinyl chloride, polyamide, polystyrene, cellulose resin, melamine resin, urea resin, acrylic resin, and epoxy resin. Each of the alignment control layers may be formed by rubbing a film of the inorganic or organic material described above with velvet, cloth or paper in one direction so as to provide a uniaxial alignment characteristic. Further, it is possible to compose the alignment control layer of two layers, e.g., by first forming a layer of the inorganic material and forming thereon a layer of an organic material. In still another embodiment, it is possible to form an alignment control layer on a substrate by oblique vapor deposition with the inorganic material such as SiO or $SiO_2$. It is also possible to impart an alignment-controlling effect to a substrate such as one comprising glass or plastic by effecting oblique etching after providing an inorganic or organic material on the substrate. The use of the alignment control layer is effective for uniformly aligning the porous polymer film in one direction.

The alignment control layer may preferably be used also as an insulating layer. Accordingly, the thickness of the alignment control layer may generally have 100 Å–1 micron, preferably 500–5000 Å. The insulating layer also has the advantage of preventing current conduction due to a trace impurity in the display layer 103, whereby the display layer little deteriorate even in a repetitive operation. In the present invention, the alignment control layers may be formed on the transparent electrodes 102 and 102a, respectively.

The reflection layer used in the present invention may include a metal films comprising a metal such as Al, Au or Ag and a dielectric mirror. The thickness of the reflection layer may generally be 0.01–100 microns, preferably 0.05–10 microns.

Hereinbelow, the second aspect of the present invention will be explained in detail with reference to drawings.

Figure 4A:
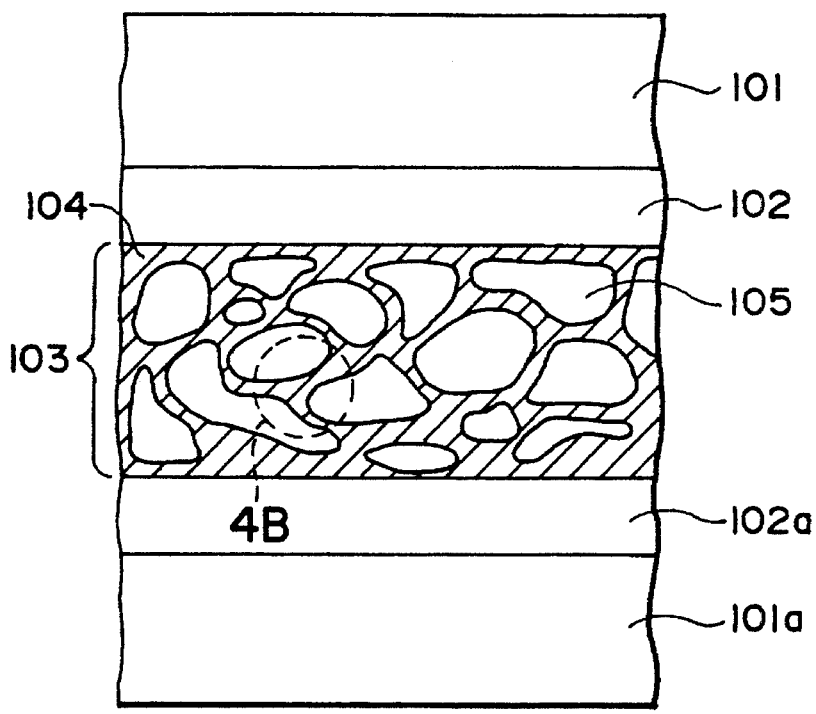
FIG. 4A is a schematic sectional view showing an embodiment of the liquid crystal device according to the present invention and FIG. 4B is a partly enlarged view thereof.

FIG. 4A is a schematic sectional view showing an embodiment of the liquid crystal device of the second aspect of the present invention for explanation of the structure thereof.

Referring to FIG. 4A, the indicated numerals denotes the same elements as in FIG. 1A described above. A display layer 103 comprises a porous polymer film 104 having a three-dimensional network structure and a low-molecular weight mesomorphic compound 105 impregnating the polymer film 104. When the display layer 103 is formed, it is possible to apply a solution of a mixture of a porous polymer film and a low-molecular mesomorphic compound onto an electrode 102 or 102a formed on a substrate 101 or 101a. Alternatively, a mixture of a low-molecular weight mesomorphic compound and a monomer and/or prepolymer for forming a porous polymer film is applied onto an electrode plate or injected into a blank cell having a prescribed gap between a pair of electrode plates, thus providing the porous polymer film with a three-dimensional network structure. In a preferred embodiment, it is possible to impregnate the porous polymer film with the low-molecular weight mesomorphic compound to constitute the display layer.

A thickness of the display layer 103 and a diameter of the low-molecular weight mesomorphic compound 105 are the same as described in the embodiment of the first aspect of the present invention.

Figure 4B:
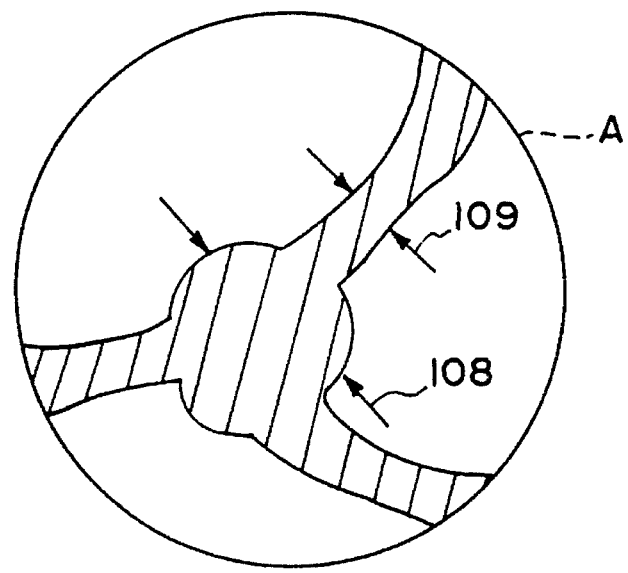

FIG. 4B shows a partly enlarged view of 4B portion in FIG. 4A, for explanation of the three-dimensional network structure and a diameter of the porous polymer film.

Referring to FIG. 4B, a hatched portion is a part of the porous polymer film 104 as a polymer matrix and other portions is the low-molecular weight mesomorphic compound 105. The porous polymer film 104 comprises a node in the form of a sphere and a fibril in the form of a bar bridging the nodes. In the second aspect of the present invention, a diameter 109 of the fibril is at most 0.3 micron, preferably at most 0.2 micron. Above 0.3 micron, light transmittance of the display layer is decreased and light scattering is increased unless the refractive index of the porous polymer film is equal (or approximately equal) to that of the low-molecular weight mesomorphic compound, thus resulting in a poor contrast. A diameter 108 of the node may preferably be at most 0.3 micron, more preferably at most 0.2 micron. However, it is possible to use a porous polymer film containing a node having a diameter above 0.3 micron because the fibrils generally predominate over the nodes in the polymer matrix to exclude an influence of the diameter of the nodes.

The diameters (108 and 109) are measured by the SEM after the low-molecular weight mesomorphic compound is removed from a sample of the display layer and then the resultant sample is subjected to (vacuum) vapor deposition with a metal. In the second aspect of the present invention, the diameter 109 of the fibril means an average diameter of some measured values. Further, the fibril may preferably have a uniform diameter distribution, and the porous polymer film having the three-dimensional network structure may be formed so as to provide the uniform diameter distribution.

In order to provide the porous polymer film containing a fibril having a diameter of at most 0.3 micron, the (porous) polymer film may preferably be subjected to stretching or etching including a plasma treatment. Particularly, the polymer film comprises one which has been subjected to stretching used in the embodiment of the first aspect of the present invention.

A volume fraction of the porous polymer film may preferably be 2–50%, particularly 5–20%. Below 2%, it is difficult to align the low-molecular weight mesomorphic compound because an alignment-controlling effect of the polymer matrix is decreased. Above 50%, it is difficult to provide a good contrast due to a decreased volume fraction of the low-molecular weight mesomorphic compound responding to an applied electrical field.

Examples of a polymer used for forming the porous polymer film may include: polyolefins such as polyethylene and polypropylene; polyvinylidene fluoride; polytetrafluoroethylene; polyacrylates; polymethacrylates; an epoxy resin; and polyvinyl alcohol. The above polymers may preferably have an average molecular weight (Mw) of 10,000 or above, more preferably 50,000 or above. Below 10,000, the porous polymer film material has poor strength, thus resulting in distortion thereof.

Examples of the porous polymer film may include: Hipore 1000, 2000, 3000, 4000 (manufactured by Asahi Kasei Kogyo K.K.); KT-50, LE-85, Duracard, Excepole (manufactured by Mitsubishi Kasei K.K.); and Celpore (manufactured by Sekisui Kasei Kogyo K.K.). However, the porous polymer film is not restricted to the above examples.

The porous polymer film may preferably have a surface energy of 25 dyn/cm or below more preferably 20 dyn/cm or below. Particularly, a polytetrafluoroethylene film may be suitable for providing the above porous polymer film. The advantages of the polytetrafluoroethylene film are described in the embodiment of the first aspect of the present invention.

Hereinbelow, the third aspect of the present invention will be explained in detail with reference to drawings.

Figure 6:
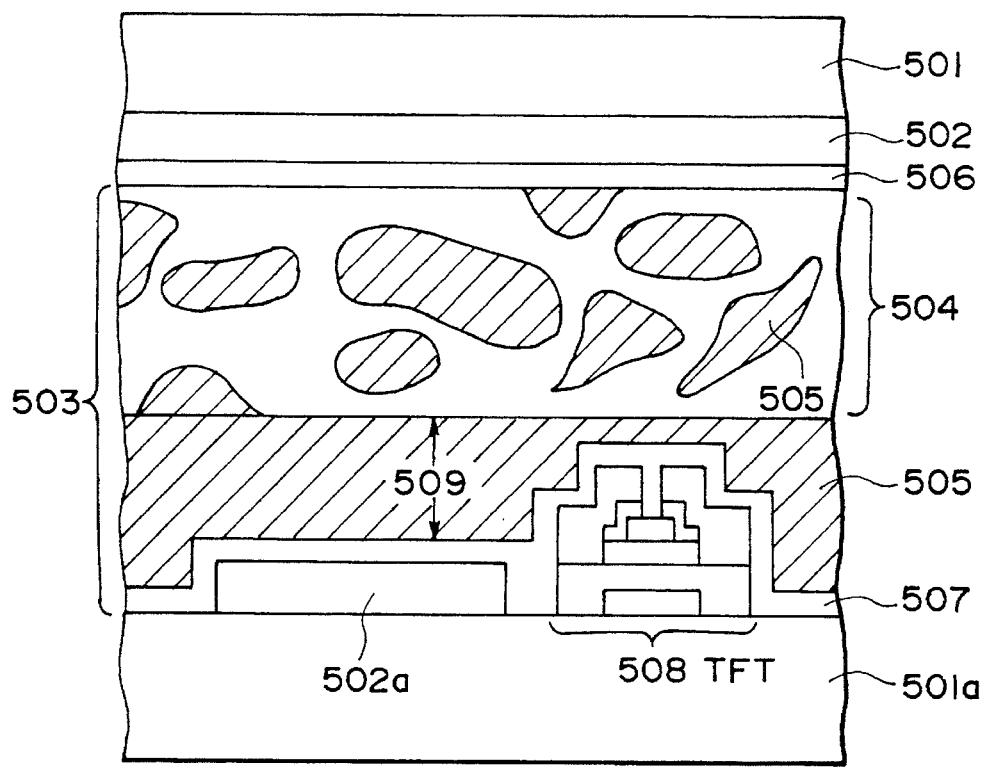
FIG. 6 is a schematic sectional view showing an embodiment of the liquid crystal device of the present invention.

FIG. 6 is a schematic sectional view showing an embodiment of the liquid crystal device of the third aspect of the present invention for explanation of the structure thereof.

Referring to FIG. 6, the liquid crystal device includes a display layer 503 comprising a first display layer 504 and a second display layer 509. The display layer 503 is disposed between a pair of substrates 501 and 501a each having thereon electrodes 502 and 502a.

Each of the substrates 501 and 501a may comprise glass or plastics, e.g., in the form of plate or film.

Examples of a polymer film used as the substrates may include those enumerated in the embodiment of the first aspect of the present invention.

The electrodes 502 and 502a formed on the substrates may include a transparent electrode comprising ITO (indium-tin-oxide) or $SnO_2$, and a metal film comprising Al, Au, Ag, Cu or Cr. It is possible to use the electrodes as an electrode and a reflective layer in a reflection-type display device.

The first display layer 504 is directly formed on the electrode 502 or is disposed thereon through the medium of an adhesive layer 506. The first display layer comprises a porous film and a low-molecular weight mesomorphic compound 505 impregnating the porous film. The porous film may comprise a polymer, ceramics, glass, etc., preferably a polymer.

In preparation of the porous polymer film, it is possible to use various methods wherein: a polymer is dispersed into a liquid and the like; phase separation through polymerization of monomer or prepolymer is conducted; a dispersion of a polymer, an inorganic material, liquid, etc. is formed into film and then the inorganic material and the liquid are removed or extracted from the resultant film; a dynamic process such as stretching is performed; and fibrous or granular polymer s formed into a porous polymer. Among them, the dynamic process such as stretching may preferably be used in view of high strength or exclusion of impurities. The stretching may be performed in the same manner as in the embodiment of the first aspect of the invention in order to induce sufficient irregularity in molecular orientation of the low-molecular weight mesomorphic compound and impart good transmittance to the display layer under voltage application.

The thickness of the first display layer 504 may generally be 0.5–100 microns, preferably 1–50 microns. Below 0.5 micron, it is difficult to obtain sufficient contrast. On the other hand, above 100 microns, it is difficult to drive the liquid crystal device at high speed as a large driving voltage is required.

The structure or constitution of the first display layer 504 is the same as in the display layer 103 in the embodiment of the first aspect of the present invention. Similarly, the porous polymer film may preferably comprise, e.g., polyethylene and polytetrafluoroethylene having an average molecular weight (Mw) of at least 50,000 and also having a surface energy of 25 dyn/cm or below, particularly 20 dyn/cm, described in the embodiment of the first aspect of the present invention.

The second display layer 509 comprises a low-molecular weight mesomorphic compound 505.

Preparation of the second display layer is effective in obtaining a high volume fraction of the mesomorphic compound and providing the first display layer having a practical structure and strength, thus resulting in good display characteristics.

The thickness of the second display layer 509 may generally be 0.5–15 microns, preferably 1–10 microns. Below 0.5 micron, it is difficult to improve display characteristics such as a transmittance, contrast and threshold voltage. Above 15 microns, a threshold voltage and response speed are decreased because an alignment-controlling force imparted by the porous film and the substrates is lowered. In case where an active matrix structure having a thin film transistor (TFT) 508 is employed, the TFT 508 may be formed on the substrate 501a. The second display layer 509 is effective in suppressing distortion of the porous film due to the formation of the TFT.

The second display layer 509 may be formed on the both electrode plates.

In FIG. 6, an alignment film 507 may be formed on the electrode plates (and the TFT). The alignment film 507 may include: a homeotropic-alignment film and a homogeneous-alignment film. The alignment film 507 may optionally be subjected to rubbing and may be selected so as to meet requirements of display characteristics.

Figure 8:
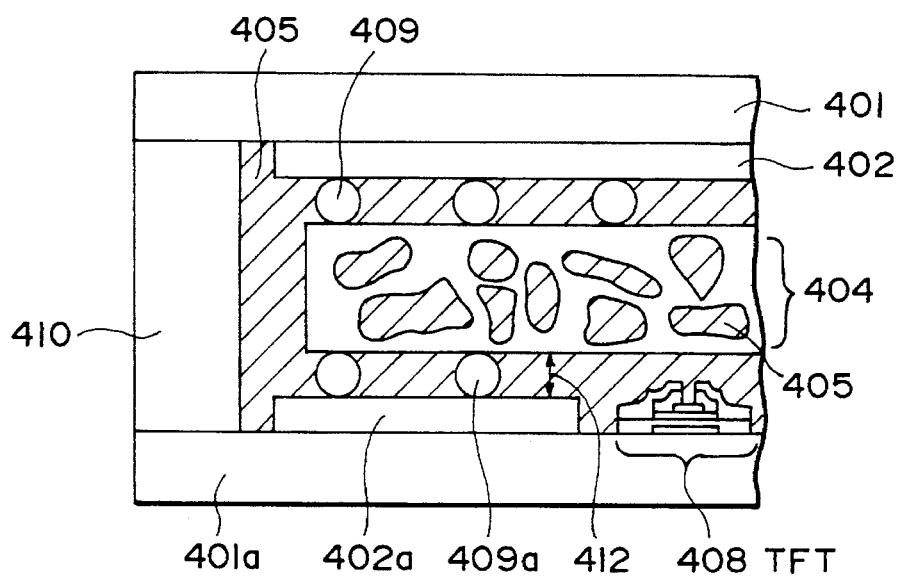
FIG. 8 is a schematic sectional view showing an embodiment of the liquid crystal device according to the present invention.

FIG. 8 shows another embodiment of the liquid crystal device having a sandwich-structure of a display layer according to the third aspect of the present invention.

Referring to FIG. 8, a first display layer 404 is sandwiched between a second display layer comprising a low-molecular weight mesomorphic compound 405. The first display layer 404 comprises a porous film and a low-molecular weight mesomorphic compound 405 impregnating the porous film, and is disposed between a pair of substrates 401 and 401a each having thereon electrodes 402 and 402a. The first display layer 404 is spaced so as to provide a gap 412 by beads spacers 409 and 409a comprising beads of glass, alumina, silica, etc. It is possible to form a TFT 408 on the substrate 401a. A spacer 410 is disposed between the pair of substrates 401 and 401a.

Figure 7A:
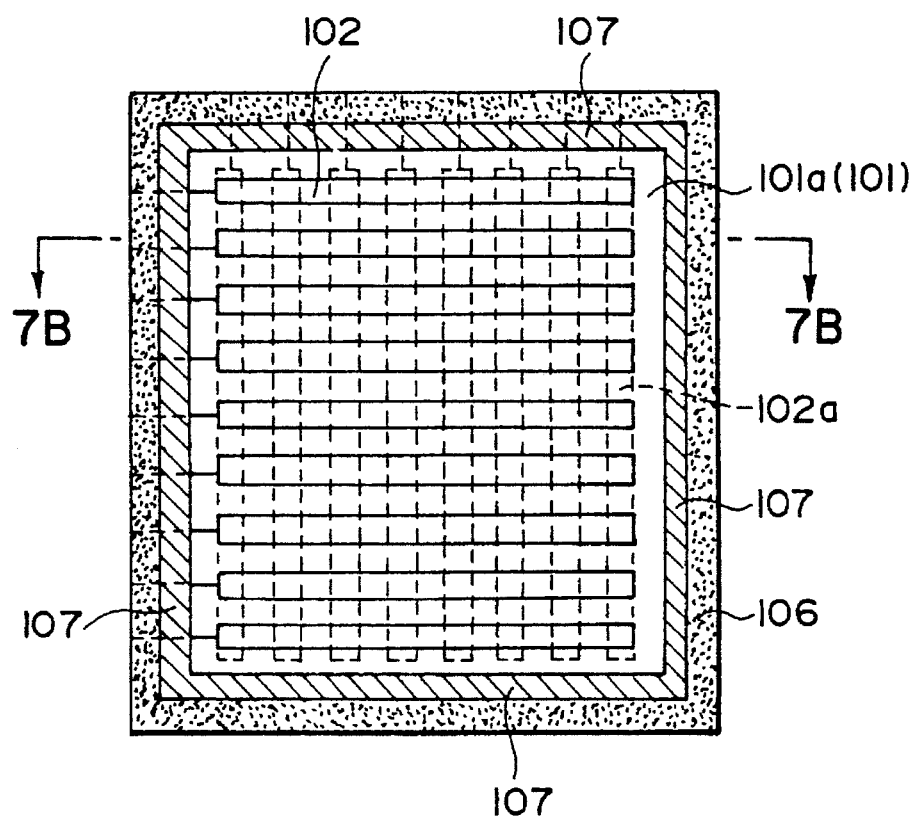
FIG. 7A is a schematic plan view of the liquid crystal device of the present invention.
Figure 7B:
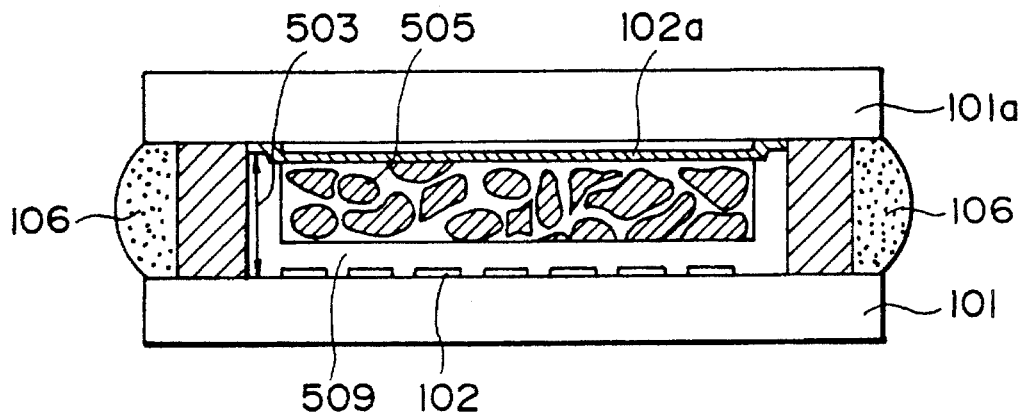
FIG. 7B is schematic view of the device shown in FIG. 7A taken along sectional 7B—7B.

FIGS. 7A and 7B show another structural embodiment of the liquid crystal device of the third aspect of the present invention, wherein FIG. 7A is a schematic plan view of the device and FIG. 7B is a schematic view of the device taken along sectional 7B—7B.

Referring to FIGS. 7A and 7B, the structure of the liquid crystal device may be the same as in the embodiment described in the first aspect of the present invention other than a display layer structure. A display layer 503 comprises a first display layer comprising a porous film and a low-molecular weight mesomorphic compound 505 impregnating the porous film, and a second display layer 509 comprising the low-molecular weight mesomorphic compound. The first display layer may preferably be formed on the electrode plate by the medium of an adhesive layer comprising an epoxy-type adhesive, etc.

The display apparatus of the present invention includes the above-mentioned liquid crystal device any one of the first to third aspect of the present invention, means for emitting light, means for applying voltage to the device, and means for separating the light into transmitted light and scattered light.

FIG. 3 shows an explanatory view of an embodiment of the display apparatus of the present invention. The display apparatus is a full-color projection-type display apparatus employing a schlieren optical system.

Referring to FIG. 3, white light emitted by a light source unit 301 is separated into light fluxes having three primary colors of R (red), G (green) and B (blue) by dichloic mirrors 302, 302a and 302b to be projected to liquid crystal devices 303, 303a and 303b. A non-selected picture element in the device is turned into a white scattering state to scatter the incident light and a selected picture element is allowed to transmit the incident light. The transmitted light fluxes and the scattered light fluxes are separated by schlieren optical systems 304, 304a and 304b including schlieren lenses 308, 308a and 308b, and then are combined by a dichloic prism 305 to be projected onto a screen (not shown) through a projection lens 306, whereby good full-color images can be obtained. The liquid crystal devices 303, 303a and 303b are supplied with voltage by a driving unit 307 for driving the liquid crystal devices. The liquid crystal devices in this embodiment can employ a simple matrix system or a non-linear optical device, but may more preferably be a type comprising a thin film transistor (TFT) as a switch for each picture element in view of display contrast, response speed and gradation display.

The display device of the present invention is illuminated with light, so that display is effected by employing the resultant scattered light. More specifically, an electric field is applied to the display layer in the liquid crystal device, whereby the low-molecular weight mesomorphic compound responds to the electric field to show a uniform alignment state (i.e. transparent state) which is different from that in the absence of the electric field (i.e., scattering state), thereby to provide a difference in scattering degree of the incident light before and under the electric field application. The display method of the present invention utilizes the resultant difference in scattering degree of the scattered light for effecting display.

Hereinbelow, the present invention will be explained in more detail with reference to Examples.

EXAMPLE 1

A blank cell for forming a display layer comprising a low-molecular weight mesomorphic compound (or liquid crystal) and a stretched porous polymer film was prepared as follows.

Onto a 1.1 mm-thick substrate comprising a glass (available from Matsuzaki Sinku K.K.) having thereon a vapor-deposited layer comprising a 2000 Å-thick ITO, an epoxy-type adhesive (Stract Bond, EH-454NF, mfd. by Mitsui Toatu Kagaku K.K.) was applied and then a 50 micron-thick porous polypropylene film (Hipore 3000, manufactured by Asahi Kasei Kogyo K.K.; porosity=90%) having been subjected to biaxial stretching (stretch ratio=4×5) was laminated on the resultant substrate, followed by heating for adhesion.

Then, another glass substrate having thereon a 2000 Å-thick vapor-deposited ITO layer was applied onto the above-prepared substrate with an adhesive comprising a glass fiber spacer (50 micron φ, manufactured by Nippon Denki Garasu K.K.), followed by heat curing to provide a cell structure.

Into the above-prepared cell, a nematic liquid crystal (composition) ZLI-2008 (Example Compound No. (I-36) manufactured by Merck Co.; $T_{N-I}$=64° C.) was injected by a capillary-rise method under reduced pressure, followed by restoration to normal pressure to effect impregnation of the porous polypropylene film with the liquid crystal ZLI-2008, whereby a liquid crystal device was prepared.

The liquid crystal device was subjected to pulse voltage application (rectangular waveform of 60 Hz and ±200 V), whereby the display layer changed from a scattering state (under no voltage application) into a transparent state to provide a contrast of 20:1 and a threshold voltage of 68 V (1.4 V/μm) at 25° C.

Then, the liquid crystal device was left to stand for 100 hours at 80° C., whereby the contrast and threshold voltage were not changed to show a good durability.

Herein, a threshold voltage (V) denotes a voltage required for providing a transmittance change of 10% when a difference in light transmittance between the most transmitted (transparent) state and the most scattered (scattering) state is represented by 100.

COMPARATIVE EXAMPLE 1

A mixture of a polymerizable monomer composition and a low-molecular weight mesomorphic compound was prepared by mixing the following ingredients in the indicated proportions.

| Ingredients | wt. part(s) |
| --- | --- |
| TPA-330 (mfd. by Nippon Kayaku K.K.) | 6 |
| M-117 (mfd. by Toa Gosei K.K.) | 4 |
| 2-methyl-1-phenyl-propane-1-one | 0.2 |
| ZLI-2008 (mfd. by E. Merck Co. (Ex. Comp. No. I-36)) | 40 |

The above-prepared mixture was injected into a cell which was formed by applying a pair of glass substrates each having thereon a 2000 Å-thick ITO to each other with an adhesive containing glass fiber spacers (50 micron φ, mfd. by Nippon Denki Garasu K.K.), followed by photopolymerization with ultraviolet rays to prepare a liquid crystal device (polymer fraction of about 20%).

The liquid crystal device was subjected to pulse voltage application (rectangular waveform of 60 Hz and ±200 V), whereby the display layer changed from a scattering state (under no voltage application) into a transparent state to provide a contrast of 10:1. Further, a threshold voltage was 58 V (1.2 V/μm) at 25° C.

Further, the above liquid crystal device was left to stand for 100 hours at 80° C., whereby a contrast was decreased to 6:1 and a threshold voltage was increased to 89 V (1.6 V/μm) at 25° C., thus failing to provide a good stability or durability.

EXAMPLE 2

A blank cell for forming a display layer comprising a low-molecular weight mesomorphic compound (or liquid crystal) and a stretched porous polymer film was prepared as follows.

Onto a 1.1 mm-thick substrate comprising a green glass (available from Matsuzaki Sinku K.K.) having thereon a vapor-deposited layer comprising a 2000 Å-thick ITO, an epoxy-type adhesive (Stract Bond, EH-454NF, mfd. by Mitsui Toatu Kagaku K.K.) was applied and then a 12 micron-thick porous polytetrafluoro ethylene film (porosity= 85%) having been subjected to biaxial stretching (stretch ratio=4×3) was laminated on the resultant substrate, followed by heating for adhesion.

Then, another glass substrate having thereon a 2000 Å-thick vapor-deposited ITO layer was applied onto the above-prepared substrate with an adhesive comprising a glass fiber spacer (10 micron φ, manufactured by Nippon Denki Garasu K.K.), followed by heat curing to provide a cell structure.

Into the above-prepared cell, a nematic liquid crystal (composition) ZLI-2008 (Example Compound No. (I-36) manufactured by Merck Co.; $T_{N-I}$=64° C.) was injected by a capillary-rise method under reduced pressure, followed by restoration to normal pressure to effect impregnation of the porous polytetrafluoroethylene film with the liquid crystal ZLI-2008, whereby a liquid crystal device was prepared.

The liquid crystal device was subjected to pulse voltage application (rectangular waveform of 60 Hz and ±50 V), whereby the display layer changed from a scattering state (under no voltage application) into a transparent state to provide a contrast of 15:1 and a threshold voltage of 6 V (0.6 V/μm) at 25° C.

Then, the liquid crystal device was left to stand for 100 hours at 120° C., whereby the contrast and threshold voltage were not changed to show a good durability.

COMPARATIVE EXAMPLE 2

A mixture of a polymerizable monomer composition and a low-molecular weight mesomorphic compound was prepared by mixing the following ingredients in the indicated proportions.

| Ingredients | wt. part(s) |
| --- | --- |
| TPA-330 (mfd. by Nippon Kayaku K.K.) | 6 |
| M-117 (mfd. by Toa Gosei K.K.) | 4 |
| 2-methyl-1-phenyl-propane-1-one | 0.2 |
| ZLI-2008 (mfd. by E. Merck Co. (Ex. Comp. No. I-36)) | 40 |

The above-prepared mixture was injected into a cell which was formed by applying a pair of glass substrates each having thereon a 2000 Å-thick ITO to each other with an adhesive containing glass fiber spacers (10 micron φ, mfd. by Nippon Denki Garasu K.K.), followed by photopolymerization with ultraviolet rays to prepare a liquid crystal device (polymer fraction of about 20%).

The liquid crystal device was subjected to pulse voltage application (rectangular waveform of 60 Hz and ±50 V), whereby the display layer changed from a scattering state (under no voltage application) into a transparent state to provide a contrast of 8:1. Further, a threshold voltage was 13 V (1.3 V/μm) at 25° C. When an applied voltage was changed upward and downward, a difference between the upward voltage and downward voltage at a transmittance of 50% was 6 V. The difference of 6 V was evaluated as hysteresis.

Further, the above liquid crystal device was left to stand for 100 hours at 120° C., whereby a contrast was decreased to 3:1 and a threshold voltage was increased to 21.5 V (2.2 V/μm) at 25° C., thus failing to provide a good stability or durability.

COMPARATIVE EXAMPLE 3

A mixture of a polymerizable monomer composition and a low-molecular weight mesomorphic compound was prepared by mixing the following ingredients in the indicated proportions.

| Ingredients | wt. part(s) |
| --- | --- |
| TPA-330 (mfd. by Nippon Kayaku K.K.) | 6 |
| M-117 (mfd. by Toa Gosei K.K.) | 4 |
| 2-methyl-1-phenyl-propane-1-one | 0.2 |
| ZLI-2008 (mfd. by E. Merck Co. (Ex. | 80 |

| Ingredients | wt. part(s) |
|---|---|
| Comp. No. I-36) | 5 |

The above-prepared mixture was injected into a cell which was formed by applying a pair of glass substrates each having thereon a 2000 Å-thick ITO to each other with an adhesive containing glass fiber spacers (50 micron φ, mfd. by Nippon Denki Garasu K.K.), followed by photopolymerization with ultraviolet rays to prepare a liquid crystal device (polymer fraction of about 10%). At this time, the display layer was in the scattering state but an irregular portion in the form of a mottle was observed.

The liquid crystal device was subjected to pulse voltage application (rectangular waveform of 60 Hz and ±200 V), whereby the display layer changed from a scattering state (under no voltage application) into a transparent state to provide a contrast of 2:1. However, the transparent state was not restored to the scattering state when the applied voltage was removed.

COMPARATIVE EXAMPLE 4

A blank cell for forming a display layer comprising a low-molecular weight mesomorphic compound (or liquid crystal) and a porous polymer film was prepared as follows.

Onto a 1.1 mm-thick substrate comprising a green glass (available from Matsuzaki Sinku K.K.) having thereon a vapor-deposited layer comprising a 2000 Å-thick ITO, an epoxy-type adhesive (Stract Bond, EH-454NF, mfd. by Mitsui Toatu Kagaku K.K.) was applied and then a 140 micron-thick porous nitrocellulose filter (A-080A013A, mfd. by Toyo Roshi K.K.; pore size=0.8 microns, porosity= 78%) was laminated on the resultant substrate, followed by heating for adhesion.

Then, another glass substrate having thereon a 2000 Å-thick vapor-deposited ITO layer was applied onto the above-prepared substrate with an adhesive comprising glass beads (150 micron φ), followed by heat curing to provide a cell structure.

Into the above-prepared cell, a nematic liquid crystal (composition) ZLI-2008 (Example Compound No. (I-36) manufactured by Merck Co.; $T_{N-I}=64°$ C.) was injected by a capillary-rise method under reduced pressure, followed by restoration to normal pressure to effect impregnation of the porous nitrocellulose filter with the liquid crystal ZLI-2008, whereby a liquid crystal device was prepared.

The liquid crystal device was subjected to pulse voltage application (rectangular waveform of 60 Hz and ±1000 V), whereby the display layer changed from a scattering state (under no voltage application) into a transparent state to provide a contrast of 20:1.

When an applied voltage was changed upward and downward, hysteresis in the light transmittance was observed as shown in FIG. 9. A threshold voltage at 25° C. was 330 V (22 V/μm).

Further, the above liquid crystal device was left to stand for 100 hours at 120° C., whereby a contrast was decreased to 5:1.

EXAMPLE 3

A blank cell for forming a display layer comprising a low-molecular weight mesomorphic compound (or liquid crystal) and a porous polymer film was prepared as follows.

Onto a 1.1 mm-thick substrate comprising a green glass (available from Matsuzaki Sinku K.K.) having thereon a vapor-deposited layer comprising a 2000 Å-thick ITO, an epoxy-type adhesive (Staicast 1269 Å, mfd. by Grace Japan K.K.) was applied and then a 110 micron-thick porous polymer film (fluoropore FP-500, mfd. by Sumitomo Denki Kogyo K.K.; average pore size of 5 microns and a porosity of about 75%) was laminated on the resultant substrate, followed by heating for adhesion. At this time, a diameter of a fibril of the porous polymer film was measured by a SEM (magnification of 10,000) as shown in FIG. 5A, whereby a diameter of 1 micron was obtained.

Then, the above-prepared substrate was subjected to hydrogen plasma treatment (30 W) for 130 minutes, whereby a diameter of a fibril of the porous polymer film was about 0.2 micron (FIG. 5B, SEM observation at magnification of 10,000). The thus-treated porous polymer film had a porosity of about 92%.

Then, another glass substrate having thereon a 2000 Å-thick vapor-deposited ITO layer was applied onto the above-prepared substrate with an adhesive comprising a glass fiber spacer (100 micron φ, manufactured by Nippon Denki Garasu K.K.), followed by heat curing to provide a cell structure.

Into the above-prepared cell, a nematic liquid crystal (composition) ZLI-2008 (Example Compound No. (I-36) manufactured by Merck Co.; $T_{N-I}=64°$ C.) was injected by a capillary-rise method under reduced pressure, followed by restoration to normal pressure to effect impregnation of the porous polymer film with the liquid crystal ZLI-2008, whereby a liquid crystal device was prepared.

The liquid crystal device was subjected to pulse voltage application (rectangular waveform of 60 Hz and ±300 V), whereby the display layer changed from a scattering state (under no voltage application) into a transparent state to provide a transmittance of 20% (measured value by using a tungsten (W) lamp). As a result, a good contrast of 100:1 was obtained.

At this time, a refractive index of the polymer matrix (porous polymer film) was 1.35. On the other hand, refractive indices of the nematic liquid crystal ZLI-2008 were 1.707 (n∥) and 1.517 (n⊥), thus providing a large difference among the three.

COMPARATIVE EXAMPLE 5

A liquid crystal device was prepared and evaluated in the same manner as in Example 3 except that the hydrogen plasma treatment was not conducted (a diameter of fibril of 1 micron), whereby the display layer changed from a scattering state (under no voltage application) into a transparent state to provide a transmittance of 1.8%. As a result, the display layer showed a low contrast of 5:1.

EXAMPLES 4 AND 5 AND COMPARATIVE EXAMPLE 6

Three liquid crystal devices were prepared in the same manner as in Example 3 except that a time of the hydrogen plasma treatment was changed to 100, 200, and 15 minutes, respectively.

Each of the above-prepared devices was subjected to measurement of a diameter of a fibril, a light transmittance, and a contrast. The results are shown in Table 1.

TABLE 1

| | Time of plasma treatment (min.) | Diameter of fibril (micron) | Porosity of film (%) | Transmittance (%) | Contrast |
|---|---|---|---|---|---|
| Ex. 4 | 100 | 0.28 | about 85 | 16 | 110:1 |
| Ex. 5 | 200 | 0.15 | about 94 | 28 | 60:1 |
| Comp. Ex. 6 | 15 | 0.8 | about 78 | 2 | 8:1 |

EXAMPLE 6

A blank cell for forming a display layer comprising a low-molecular weight mesomorphic compound (or liquid crystal) and a porous polymer film was prepared as follows.

Onto a 1.1 mm-thick substrate comprising a green glass (available from Matsuzaki Sinku K.K.) having thereon a vapor-deposited layer comprising a 2000 Å-thick ITO, an epoxy-type adhesive (Staicast 1269A, mfd. by Grace Japan K.K.) was applied and then a 20 micron-thick porous polymer film (average pore size of 5 microns, a fibril diameter of about 0.15 micron, and a porosity of 90%) obtained by biaxial stretching (stretch ratio=8×8) a 100 micron-thick polytetrafluoroethylene film which was prepared by heat-sintering a polytetrafluoroethylene fine powder (average diameter below 0.5 micron) was laminated on the resultant substrate, followed by heating for adhesion.

Then, another glass substrate having thereon a 2000 Å-thick vapor-deposited ITO layer was applied onto the above-prepared substrate with an adhesive comprising a glass fiber spacer (20 micron $\phi$, manufactured by Nippon Denki Garasu K.K.), followed by heat curing to provide a cell structure.

Into the above-prepared cell, a nematic liquid crystal (composition) ZLI-2008 (Example Compound No. (I-36) manufactured by Merck Co.; $T_{N-I}=64°$ C.) was injected by a capillary-rise method under reduced pressure, followed by restoration to normal pressure to effect impregnation of the porous polymer film with the liquid crystal ZLI-2008, whereby a liquid crystal device was prepared.

The liquid crystal device was subjected to pulse voltage application (rectangular waveform of 60 Hz and ±60 V), whereby the display layer changed from a scattering state (under no voltage application) into a transparent state to provide a transmittance of 40%. As a result, a good contrast of 60:1 was obtained.

At this time, a refractive index of the polymer matrix (porous polymer film) was 1.35. On the other hand, refractive indices of the nematic liquid crystal ZLI-2008 were 1.707 (n∥) and 1.517 (n⊥), thus providing a large difference among the three.

EXAMPLE 7

A blank cell for forming a display layer comprising a low-molecular weight mesomorphic compound (or liquid crystal) and a porous film was prepared as follows.

Onto a 1.1 mm-thick substrate comprising a green glass (available from Matsuzaki Sinku K.K.) having thereon a vapor-deposited layer comprising a 2000 Å-thick ITO, an epoxy-type adhesive (Stract Bond, EH-454NF, mfd. by Mitsui Toatu Kagaku K.K.) was applied and then a 50 micron-thick porous film (porosity=90%) was laminated on the resultant substrate, followed by heating for adhesion.

Then, the above-prepared substrate was impregnated or saturated with a solution of polystyrene (Mw=280,000 and Tg=100° C.; mfd. by Aldrich Co.) in benzene, followed by drying and curing. The porous film was ground by means of a grinder to provide a thickness (i.e., a thickness of a first display layer) of 5 microns and then was subjected to ultrasonic cleaning with benzene to remove the polystyrene.

Then, another glass substrate having thereon a 2000 Å-thick vapor-deposited ITO layer was applied onto the above-prepared substrate with an adhesive comprising a glass fiber spacer (10 micron $\phi$, manufactured by Nippon Denki Garasu K.K.), followed by heat curing to provide a cell structure.

The thickness of the cell obtained by measuring a capacitance of the cell was 10 microns. The gap between the porous film and the opposite substrate (i.e., a thickness of a second display layer) was about 5 microns.

Into the above-prepared cell, a nematic liquid crystal (composition) ZLI-2008 (Example Compound No. (I-36) manufactured by Merck Co.; $T_{N-I}=64°$ C.) was injected by a capillary-rise method under reduced pressure, followed by restoration to normal pressure to effect impregnation of the porous film with the liquid crystal ZLI-2008 whereby a liquid crystal device was prepared.

The liquid crystal device was subjected to pulse voltage application (rectangular waveform of 60 Hz and ±40 V), whereby the display layer changed from a scattering state (under no voltage application) into a transparent state to provide a contrast of 10:1 and a threshold voltage of 6 V at 25° C. At this time, the device provided a good transmittance of 50%.

COMPARATIVE EXAMPLE 7

A liquid crystal device was prepared and evaluated in the same manner as in Example 7 except that the thickness of the porous film was changed 5 microns to 10 microns (i.e., a second display layer was not formed), whereby the display layer changed from a scattering state (under no voltage application) into a transparent state to provide a contrast of 11:1 but a high threshold voltage of 10 V at 25° C. Further, a transmittance of 30% was obtained under the voltage application.

EXAMPLES 8–10 AND COMPARATIVE EXAMPLES 8 AND 9

Five liquid crystal devices were prepared and evaluated in the same manner as in Example 7 except that the thickness of the glass fiber spacer was changed to prescribed values indicated in Table 2 below, whereby the results shown in Table 2 were obtained.

TABLE 2

| | Diameter of spacer (μmφ) | Thickness of second display layer (μm) | Contrast | Threshold voltage (V) |
|---|---|---|---|---|
| Ex. 8 | 6 | 1 | 5:1 | 4.1 |
| Ex. 9 | 12 | 7 | 14:1 | 6.7 |
| Ex. 10 | 14 | 9 | 15:1 | 7.0 |
| Comp. Ex. 8 | 5 | 0 | 2:1 | 5.2 |
| Comp. Ex. 9 | 30 | 25 | 20:1 | 20 |

As described hereinabove, according to the present invention, there are provided liquid crystal devices each including a specific display layer comprising a porous (polymer) film and a low-molecular weight mesomorphic compound.

More specifically, according to the first aspect of the present invention, there is provided a liquid crystal device employing a display layer comprising a stretched porous polymer film impregnated with a low-molecular weight mesomorphic compound, whereby the device can easily be prepared and the display layer has a high strength and good heat resistance even when a large amount of the low-molecular weight mesomorphic compound is contained in the display layer. Further, good display and driving characteristics free of deterioration in durability are obtained because inclusion of impurities in display materials and dissolution of impurities in the low-molecular weight mesomorphic compound are substantially suppressed by conducting stretching treatment. When a porous polymer film has a low surface energy, it is possible to provide a liquid crystal device having good characteristics such as a high strength, good heat resistance, good gradation property, good temperature property, high response speed, and high durability even under a condition of high volume fraction of the low-molecular weight mesomorphic compound.

According to the second aspect of the present invention, there is provided a liquid crystal device employing a display layer comprising a porous polymer film having a three dimensional network structure with a fibril diameter of at most 0.3 micron, and a low-molecular weight mesomorphic compound impregnating the porous polymer film, whereby a good light transmittance and high contrast are realized even when a refractive index of the porous polymer film is not sufficiently matched with that of the mesomorphic compound.

According to the third aspect of the present invention, there is provided a liquid crystal device employing a display layer comprising a first display layer comprising a porous film impregnated with a low-molecular weight mesomorphic compound, and a second display layer comprising the mesomorphic compound; whereby a high strength of the porous film as a matrix is obtained even when the mesomorphic compound is contained in the display layer in a large proportion. Further, the device provides a high light transmittance, good contrast and low threshold voltage.

The above-mentioned devices are effective for providing a display apparatus and display method capable of providing a good display with a large area and a high contrast when each of the devices is used in combination of other display elements such as a voltage application means, a light, a light-separating means.

What is claimed is:

1. A liquid crystal device, comprising:
   a pair of electrode plates, and a display layer disposed between the electrode plates, said display layer comprising a stretched porous polymer film having a stretch ratio of 1.5 to 50 and a low-molecular weight mesomorphic compound;
   said display layer having been prepared by uniaxially stretching a porous or non-porous polymer film to form open pores, and then impregnating said open pores in said stretched polymer film with said low-molecular weight mesomorphic compound; and
   wherein molecules of said low molecular weight mesomorphic compound are in an alignment state substantially free from uniaxial alignment under no voltage application.

2. A device according to claim 1, wherein said stretched polymer film has a surface energy of at most 25 dyn/cm.

3. A device according to claim 1, wherein said stretched polymer film comprises polytetrafluoroethylene.

4. A device according to claim 1, wherein said low-molecular weight mesomorphic compound has a volume fraction of at least 80%.

5. A display apparatus, including: a liquid crystal device according to claim 1, means for emitting light, means for applying voltage to said device, and means for separating said light into transmitted light and scattered light.

6. A display method, comprising: illuminating a liquid crystal device according to claim 1 with light and effecting display by separating said light into transmitted light and scattered light.

7. A method, according to claim 6, wherein an electric field is applied to said liquid crystal device to cause an electric field response of said low-molecular weight mesomorphic compound, which response results in a difference in scattering degree of said scattered light.

8. A device according to claim 1, wherein said display layer shows a scattering state under no voltage application and a transparent state under voltage application.

9. A liquid crystal device, comprising:
   a pair of electrode plates, and a display layer disposed between the electrode plates;
   said display layer comprising a porous polymer film having a surface energy of at most 25 dyn/cm and having a three-dimensional network structure characterized by a fibril having a diameter of at most 0.3 micron, and a low-molecular weight mesomorphic compound impregnating said porous polymer film.

10. A device according to claim 9, wherein said porous polymer film comprises polytetrafluoroethylene.

11. A device according to claim 9, wherein said low-molecular weight mesomorphic compound has a volume fraction of at least 80%.

12. A display apparatus, including: a liquid crystal device according to claim 9, means for emitting light, means for applying voltage to said device, and means for separating said light into transmitted light and scattered light.

13. A display method, comprising: illuminating a liquid crystal device according to claim 9 with light and effecting display by separating said light into transmitted light and scattered light.

14. A method, according to claim 13, wherein an electric field is applied to said liquid crystal device to cause an electric field response of said low-molecular weight mesomorphic compound, which response results in a difference in scattering degree of said scattered light.

15. A liquid crystal device, comprising:
   a pair of electrode plates having first and second display layers disposed between the electrode plates;
   wherein said first display layer comprises a porous film and a low-molecular weight mesomorphic compound impregnating said porous film, and wherein said second display layer consists essentially of said low-molecular weight mesomorphic compound.

16. A device according to claim 15, wherein said second display layer has a thickness of 0.5 to 15 microns.

17. A device according to claim 15, wherein said porous film comprises a polymer.

18. A device according to claim 15, wherein a thin film transistor is formed on the electrode plate having thereon said second display layer.

19. A display apparatus, including: a liquid crystal device according to claim 15, means for emitting light, means for applying voltage to said device, and means for separating said light into transmitted light and scattered light.

20. A display method, comprising: illuminating a liquid crystal device according to claim 15 with light and effecting display by separating said light into transmitted light and scattered light.

21. A method, according to claim 20, wherein an electric field is applied to said liquid crystal device to cause an electric field response of said low-molecular weight mesomorphic compound, which response results in a difference in scattering degree of said scattered light.

22. A liquid crystal device, comprising:

- a pair of electrode plates, and a display layer disposed between the electrode plates, said display layer comprising a stretched porous polymer film and a low-molecular weight mesomorphic compound;
- said display layer having been prepared by biaxially stretching a porous or non-porous polymer film to form open pores, and then impregnating said open pores in said stretched polymer film with said low-molecular weight mesomorphic compound; and
- wherein molecules of said low-molecular weight mesomorphic compound are in an alignment state substantially free from uniaxial alignment under no voltage application.

23. A device according to claim 22, wherein said stretched porous polymer film has a stretch ratio of from 1.4 to 30 in each stretching direction.

24. A device according to claim 22, wherein said stretched polymer film has a surface energy of at most 25 dyn/cm.

25. A device according to claim 22, wherein said stretched polymer film comprises polytetrafluoroethylene.

26. A device according to claim 22, wherein said low-molecular weight mesomorphic compound has a volume fraction of at least 80%.

27. A device according to claim 22, wherein said display layer shows a scattering state under no voltage application and a transparent state under voltage application.

28. A display apparatus, including: a liquid crystal device according to claim 22, means for emitting light, means for applying voltage to said device, and means for separating said light into transmitted light and scattered light.

29. A display method, comprising: illuminating a liquid crystal device according to claim 22 with light and affecting display by separating said light into transmitted light and scattered light.

30. A method according to claim 29, wherein an electric field is applied to said liquid crystal device to cause an electric field response of said low-molecular weight mesomorphic compound, which response results in a difference in scattering degree of said scattered light.

* * * * *

UNITED STATES PATENT AND TRADEMARK OFFICE
CERTIFICATE OF CORRECTION

PATENT NO. : 5,475,515

DATED : December 12, 1995

INVENTOR(S): Kazuo Yoshinaga et al.       Page 1 of 3

It is certified that error appears in the above-identified patent and that said Letters Patent is hereby corrected as shown below:

<u>COLUMN 3</u>

Line 49, "Still" should read -- A still--.

<u>COLUMN 4</u>

Line 32, "is" should read --is a--.

<u>COLUMN 5</u>

Line 18, "film.(such" should read --film (such--
Line 62, "thereof-" should read --thereof.--.

<u>COLUMN 6</u>

Line 26, "along." should read --alone.--
Line 66, "preferably" should read --preferably be--.

<u>COLUMN 8</u>

Line 12, "using" should read -being used--
Line 24, "Gorerex" should read --Goretex--.

UNITED STATES PATENT AND TRADEMARK OFFICE
CERTIFICATE OF CORRECTION

PATENT NO. : 5,475,515

DATED : December 12, 1995

INVENTOR(S): Kazuo Yoshinaga et al.

It is certified that error appears in the above-identified patent and that said Letters Patent is hereby corrected as shown below:

COLUMN 15

Comp. (I-28), "N=N" should read --N=N--.

COLUMN 16

Line 67, "lasers" should read --laser--.

COLUMN 18

Line 33, "films" should read --film--
Line 43, "denotes" should read --denote--.

COLUMN 20

Line 37, "polymer s" should read --polymers--.

COLUMN 21

Line 53, "device" should read --device,--
Line 54, "aspect" should read --aspects--.

UNITED STATES PATENT AND TRADEMARK OFFICE
CERTIFICATE OF CORRECTION

PATENT NO. : 5,475,515

DATED : December 12, 1995

INVENTOR(S) : Kazuo Yoshinaga et al.

It is certified that error appears in the above-identified patent and that said Letters Patent is hereby corrected as shown below:

COLUMN 26

Line 5, "1269 Å," should read --1269A.--.

COLUMN 32

Line 16, "affecting" should read --effecting--.

Signed and Sealed this

Fourth Day of June, 1996

Attest:

BRUCE LEHMAN

Attesting Officer

Commissioner of Patents and Trademarks